(12) United States Patent
Baird et al.

(10) Patent No.: US 10,467,250 B2
(45) Date of Patent: Nov. 5, 2019

(54) DATA MODEL DESIGN COLLABORATION USING SEMANTICALLY CORRECT COLLABORATIVE OBJECTS

(71) Applicant: AtScale, Inc., San Mateo, CA (US)

(72) Inventors: Matthew Baird, Belmont, CA (US); James Lai, Redwood City, CA (US)

(73) Assignee: AtScale, Inc., San Mateo, CA (US)

( * ) Notice: Subject to any disclaimer, the term of this patent is extended or adjusted under 35 U.S.C. 154(b) by 885 days.

(21) Appl. No.: 14/968,812

(22) Filed: Dec. 14, 2015

(65) Prior Publication Data

US 2017/0169092 A1    Jun. 15, 2017

(51) Int. Cl.
*G06F 16/23* (2019.01)
*G06F 16/28* (2019.01)

(52) U.S. Cl.
CPC ........ *G06F 16/283* (2019.01); *G06F 16/2365* (2019.01); *G06F 16/2379* (2019.01); *G06F 16/288* (2019.01)

(58) Field of Classification Search
CPC ................................................. G06F 17/30592
See application file for complete search history.

(56) References Cited

U.S. PATENT DOCUMENTS

| | | | |
|---|---|---|---|
| 6,684,207 | B1 | 1/2004 | Greenfield et al. |
| 8,010,554 | B1 | 8/2011 | Zhou |
| 9,600,554 | B2 | 3/2017 | Gerweck et al. |
| 2004/0236767 | A1 | 11/2004 | Soylemez et al. |
| 2005/0256912 | A1* | 11/2005 | Krishnan .......... G06F 17/30592 707/203 |
| 2005/0278290 | A1 | 12/2005 | Bruce |
| 2007/0208721 | A1 | 9/2007 | Zaman |
| 2008/0046481 | A1* | 2/2008 | Gould ............... G06F 17/30592 707/203 |

(Continued)

OTHER PUBLICATIONS https://451research.com/report-short?entityId=92407, 451 Research Impact Report, "Kyvos adds SQL support, availability on Google Cloud for OLAP-on-Hadoop" May 8, 2017, 1 page.

(Continued)

*Primary Examiner* — Dawaune A Conyers
(74) *Attorney, Agent, or Firm* — Armis IP Law, LLC

(57) ABSTRACT

The present disclosure provides a detailed description of techniques for data model design collaboration using semantically correct collaborative objects. Certain embodiments comprise detecting various interaction events from designers collaborating on designing a virtual multidimensional data model to generate unit of work objects characterizing certain design transactions invoked by the interaction events. The unit of work objects are used to determine a set of committed modifications to the virtual multidimensional data model design for broadcasting to the collaborating designers. Some embodiments comprise unit of work objects based on various multidimensional data model rules, syntactic rules, semantic rules, and/or other criteria to determine valid committed modifications. Other embodiments comprise unit of work objects from multiple design transactions that are merged to determine the committed modifications. Further embodiments comprise committed modifications that are derived from the differences between the design changes and the then current virtual multidimensional data model.

20 Claims, 15 Drawing Sheets

(56) References Cited

U.S. PATENT DOCUMENTS

| | | | |
|---|---|---|---|
| 2009/0004885 A1* | 1/2009 | Komatsu | H01L 21/31055 438/782 |
| 2009/0018996 A1 | 1/2009 | Hunt et al. | |
| 2009/0249125 A1 | 10/2009 | Bhatawdekar et al. | |
| 2010/0241477 A1 | 9/2010 | Nylander et al. | |
| 2011/0252049 A1 | 10/2011 | Marinescu et al. | |
| 2012/0089564 A1 | 4/2012 | Bakalash et al. | |
| 2012/0102453 A1 | 4/2012 | Patch et al. | |
| 2013/0144566 A1 | 6/2013 | De Biswas | |
| 2014/0258930 A1* | 9/2014 | Colle | G06F 3/0482 715/810 |
| 2015/0278334 A1 | 10/2015 | Gerweck et al. | |

OTHER PUBLICATIONS https://www.slideshare.net/AtulSharma225/kyvos-insights-datasheet-60646546 "Kyvos insights", Apr. 8, 2016, 2 pages.

International Preliminary Report & Written Opinion of PCT Application No. PCT/US2015/022082, dated Jun. 25, 2015, 3 pages total.

International Search Report & Written Opinion of PCT Application No. PCT/US2016/031684, dated Oct. 19, 2016, 6 pages total.

https://www.ibm.com/support/knowledgecenter/en/ssw_i5_54/rzajq/rzajqdispatcher.htm, "Query Dispatcher", downloaded May 2, 2017, 1 page.

International Search Report of PCT Application No. PCT/US2016/056484, dated Feb. 7, 2017, 3 pages total.

* cited by examiner

DATA MODEL DESIGN COLLABORATION USING SEMANTICALLY CORRECT COLLABORATIVE OBJECTS

FIELD

This disclosure relates to the field of data analytics, and more particularly to techniques for data model design collaboration using semantically correct collaborative objects.

BACKGROUND

With the continued proliferation of information sensing devices (e.g., mobile phones, online computers, RFID tags, sensors, etc.), increasingly larger volumes of data are collected for various business intelligence purposes. For example, the web browsing activities of online users are captured in various datasets (e.g., cookies, log files, etc.) for use by online advertisers in targeted advertising campaigns. Data from operational sources (e.g., point of sale systems, accounting systems, CRM systems, etc.) can also be combined with the data from online sources. Using traditional database structures (e.g., relational) to store such large volumes of data can result in database statements (e.g., queries) that are complex, resource-intensive, and time consuming. Deploying multidimensional database structures enables more complex database statements to be interpreted (e.g., executed) with substantially less overhead. Some such multidimensional models and analysis techniques (e.g., online analytical processing or OLAP) allow a user (e.g., business intelligence analyst) to view the data in "cubes" comprising multiple dimensions (e.g., product name, order month, etc.) and associated cells (e.g., defined by a combination of dimensions) holding a value that represents a measure (e.g., sale price, quantity, etc.). Further, with such large volumes of data from varying sources and with varying structures (e.g., relational, multidimensional, delimited flat file, document, etc.), the use of data warehouses and distributed file systems (e.g., Hadoop distributed file system or HDFS) to store and access data has increased. For example, an HDFS can be implemented for databases using a flat file structure with predetermined delimiters, and associated metadata (e.g., describing the keys for the respective delimited data values), to accommodate a broad range of data types and structures. Various query languages and query engines (e.g., Impala, SparkSQL, Tez, Drill, Presto, etc.) are available to users for querying data stored in data warehouses and/or distributed file systems.

Unfortunately, multidimensional data model design environments for such distributed data systems can be limited at least in their design collaboration capabilities. Specifically, legacy approaches might merely support the design of multidimensional data models by modeling specialists using specialized tools installed locally on the specialist's computing device. In this environment, one specialist might pass control of a particular data model being designed to another specialist, but both could not concurrently work on the model. Further, each specialist is limited to working on the computing devices operating the specialized tools (e.g., software). Also, in cases when two or more specialists concurrently work on the same data model, multiple versions of the model can exist that need to be manually merged into a single version. Such legacy environments are inefficient in terms of utilization of computing and/or human resources. Further, such legacy approaches can introduce design conflicts and/or errors. For example, while design changes might be syntactically correct, semantic and/or other errors can arise from conflicting changes from various designers, the manual merge process, the incorporation of a change into the overall model, and/or other aspects inherent in the legacy approaches. Also, the need for improved multidimensional data model design collaboration continues to increase as the datasets in distributed data systems in turn continue to increase. For example, a large global enterprise might have an extensive dataset modeled by one or more complex multidimensional data models having aspects that need to be continually managed by multiple designers for various purposes. In this case, legacy approaches having a few specialist designers using specialized tools operating on a few respective computing devices will be limited in achieving the data model design change cycle time desired by the enterprise.

The problem to be solved is rooted in technological limitations of the legacy approaches. Improved techniques, and in particular, improved application of technology is needed to address the problem of providing concurrent error-free multidimensional data model design collaboration among multiple designers at various computing devices. More specifically, the technologies applied in the aforementioned legacy approaches fail to achieve the sought after capabilities of the herein disclosed techniques for data model design collaboration using semantically correct collaborative objects, thus techniques are needed to improve the application and efficacy of various technologies as compared with the legacy approaches.

SUMMARY

The present disclosure provides improved systems, methods, and computer program products suited to address the aforementioned issues with legacy approaches. More specifically, the present disclosure provides a detailed description of techniques used in systems, methods, and in computer program products for data model design collaboration using semantically correct collaborative objects. Certain embodiments are directed to technological solutions for generating various semantically correct unit of work objects corresponding to design operations concurrently invoked by multiple data model designers that can be merged, validated, and/or broadcast to the designers to facilitate collaborative multidimensional data model design, which embodiments advance the technical fields for addressing the problem of providing concurrent error-free multidimensional data model design collaboration among multiple designers at various computing devices, as well as advancing peripheral technical fields. The disclosed embodiments modify and improve over conventional approaches. In particular, practice of the disclosed techniques reduces use of computer memory, reduces demand for computer processing power, and reduces communication overhead needed for providing concurrent error-free multidimensional data model design collaboration among multiple designers at various computing devices. Some embodiments disclosed herein use techniques to improve the functioning of multiple systems within the disclosed environments.

In some embodiments, data model design collaboration using semantically correct collaborative objects can be implemented by detecting various interaction events from designers collaborating on designing a virtual multidimensional data model to generate unit of work objects characterizing certain design transactions invoked by the interaction events. The unit of work objects can be used to determine a set of modifications that can be committed to the virtual multidimensional data model design for broadcasting to the collaborating designers. In one or more embodiments, the unit of work objects can be based on various multidimensional data model rules, syntactic rules, semantic rules, and/or other criteria to ensure the committed modifications are valid in all collaboration environments. In some embodiments, the unit of work objects from multiple design transactions can be merged to determine the committed modifications. In other embodiments, the committed modifications can be derived from the differences between the design changes represented by the unit of work objects and the then current virtual multidimensional data model.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
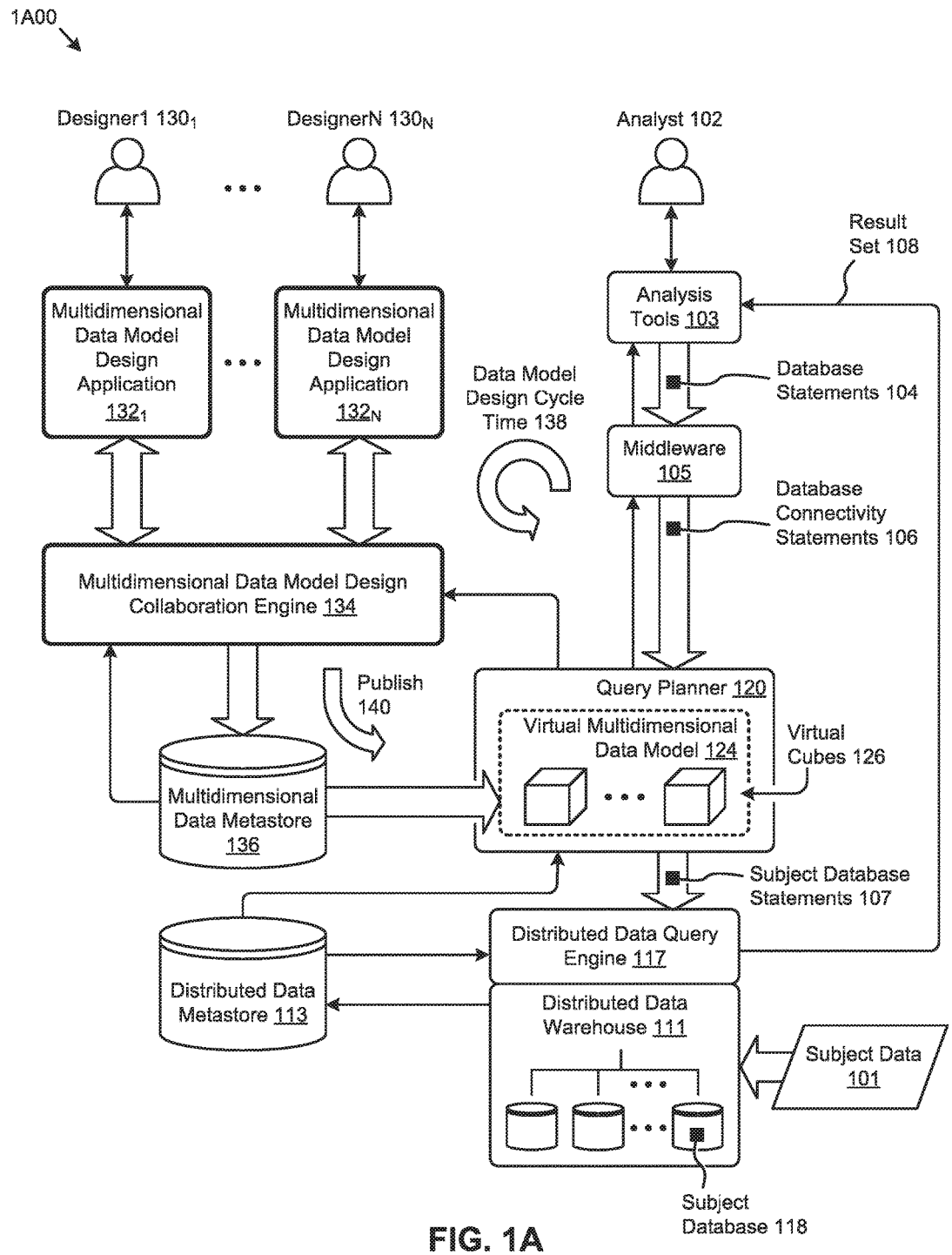
FIG. 1A depicts a diagram illustrating techniques for data model design collaboration using semantically correct collaborative objects, according to an embodiment.

Some embodiments of the present disclosure address the problem of providing concurrent error-free multidimensional data model design collaboration among multiple designers at various computing devices and some embodiments are directed to approaches for generating various semantically correct unit of work objects corresponding to design operations concurrently invoked by multiple data model designers that can be merged, validated, and/or broadcast to the designers to facilitate collaborative multidimensional data model design. More particularly, disclosed herein and in the accompanying figures are exemplary environments, systems, methods, and computer program products for data model design collaboration using semantically correct collaborative objects.

Overview

Multidimensional data model design environments associated with today's distributed data systems can be limited at least in their design collaboration capabilities. Specifically, legacy approaches facilitate the design of multidimensional data models by modeling specialists using specialized tools installed locally on the specialist's computing device. In this environment, one specialist might pass control of a particular data model being designed to another specialist, but both could not concurrently work on the model. Further, each specialist is limited to working on the computing devices operating the specialized tools (e.g., software). Also, in cases when two or more specialists concurrently work on the same data model, multiple versions of the model can exist that need to be manually merged into a single version. Further, such legacy approaches can introduce design errors. For example, semantic errors can arise from conflicting changes from various designers, the manual merge process, the incorporation of a change into the overall model, and/or other aspects of the legacy approaches. Also, the need for improved multidimensional data model design collaboration continues to increase as the datasets in distributed data systems in turn continue to increase. For example, a large global enterprise might have an extensive dataset modeled by one or more complex multidimensional data models having aspects that need to be continually managed by multiple designers for various purposes. In this case, legacy approaches having a few specialist designers using specialized tools operating on a few respective computing devices will be limited in achieving the response time desired by the enterprise.

The problem to be solved is rooted in technological limitations of the legacy approaches. Improved techniques, and in particular, improved application of technology is needed to address the problem of providing concurrent error-free multidimensional data model design collaboration among multiple designers at various computing devices.

More specifically, the technologies applied in the aforementioned legacy approaches fail to achieve the sought after capabilities of the herein disclosed techniques for data model design collaboration using semantically correct collaborative objects. Techniques are therefore needed to improve the application and efficacy of various technologies as compared with the legacy approaches.

To address the need for providing concurrent error-free multidimensional data model design collaboration among multiple designers at various computing devices, the techniques described herein group certain design operations into units of work characterized by objects that are semantically correct based on various multidimensional data model rules. The unit of work objects invoked by various collaborative designers can then be merged, validated, and the committed changes broadcast to all the designers in the collaborative environment. The foregoing approach facilitates multiple designers concurrently working on a given multidimensional data model. This approach further resolves potential conflicts before committing changes to the model by merging and validating the semantically correct unit of work objects from the designers. Various embodiments as disclosed herein serve to improve the functioning of computing and storage systems by reducing the processing resources and storage footprint needed by legacy approaches. For example, the extensive computing resources for operating multiple instances of special software tools and facilitating special tasks (e.g., manual merge, merge testing and error correction, etc.), as well as the storage capacity for managing multiple design versions, can be avoided using the herein disclosed techniques. Further, in some cases, merely the differences between the attributes describing the committed changes and the attributes describing the multidimensional data model prior to any changes is broadcast to increase response time and/or decrease the use of computing resources.

Various embodiments are described herein with reference to the figures. It should be noted that the figures are not necessarily drawn to scale and that the elements of similar structures or functions are sometimes represented by like reference numerals throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts a diagram 1A00 illustrating techniques for data model design collaboration using semantically correct collaborative objects, according to an embodiment. As an option, one or more instances of diagram 1A00 or any aspect thereof may be implemented in the context of the architecture and functionality of the embodiments described herein. Also, the diagram 1A00 or any aspect thereof may be implemented in any desired environment.

As shown in FIG. 1A, diagram 1A00 shows an analyst 102 (e.g., business intelligence analyst) interacting with certain instances of analysis tools 103 (e.g., Tableau, Excel, QlikView, etc.) that can generate various instances of database statements 104 to be interpreted on associated datasets. In some cases, the analyst 102 may want to perform analyses on a set of subject data 101 (e.g., mobile activity, social network activity, transactions, CRM activity, etc.) that is stored in a subject database 118 (e.g., as flat file data, multidimenional data, etc.) in a distributed data warehouse 111. The structure of the subject database 118 can be specified by certain subject database attributes (e.g., database definitions, schema definitions, etc.) comprising subject database metadata in a distributed data metastore 113. As an example, the distributed data warehouse 111 can be configured using the HDFS framework and the distributed data metastore 113 can be a Hive metastore. In such cases, the database statements 104 from the analysis tools 103 are conformed to database connectivity statements 106 (e.g., using ODBC, JDBC, OLE-DB, etc.) by an instance of middleware 105. The database connectivity statements 106 can then be delivered to a query planner 120 to produce associated instances of subject database statements 107 that can be issued to a distributed data query engine 117 for operation on the subject database 118. In an exemplary embodiment, the database statements 104 can be configured to operate on a virtual multidimensional data model 124. Specifically, the virtual multidimensional data model 124 can comprise various data model attributes that can be used to form one or more logical representations (e.g., virtual cubes 126) of the subject database 118. Such virtual cubes can be presented to the analyst 102 to facilitate a broad range of analyses of the underlying data (e.g., subject data 101). Specifically, the virtual multidimensional data model 124 can comprise various dimensions, measures, relationships, and/or other attributes that reference the underlying data in the subject database 118. The database statements 104 configured for the virtual multidimensional data model 124 can be received by the query planner 120 to produce associated instances of subject database statements 107 that can be issued to the distributed data query engine 117. In one or more embodiments, the distributed data query engine 117 can be a Structured Query Language (SQL) based query engine for accessing distributed file systems (e.g., Impala, SparkSQL, Tez, Drill, Presto, etc.). Other query engine configurations and partitions are possible.

For large sets of subject data 101 stored in the subject database 118, the virtual multidimensional data model 124 can be complex, comprising numerous dimensions, measures, relationships, levels, hierarchies, and/or other attributes characterizing the subject data 101. For example, a large global enterprise might have an extensive dataset modeled by one or more complex virtual multidimensional data models having aspects that need to be concurrently managed by multiple designers for various purposes in order to deliver a data model design cycle time 138 as may be required by the enterprise. In such cases, for example, the enterprise might have a designer whose role is merely to manage any dimensions related to geography. According to some embodiments, the approach shown in diagram 1A00 and described herein for providing such concurrent virtual multidimensional data model design collaboration can be facilitated by instances of a multidimensional data model design application (e.g., multidimensional data model design application $132_1, \ldots,$ multidimensional data model design application $132_N$) utilized by a plurality of data model designers (e.g., designer1 $130_1, \ldots,$ designerN $130_N$, respectively), and a multidimensional data model design collaboration engine 134. Specifically, various semantically correct unit of work objects can be generated at each instance of the multidimensional data model design application responsive to certain interactions (e.g., design operations) from the data model designers. In some cases, the interactions among the data model designers can occur concurrently. The unit of work objects invoked by the data model designers can then be merged, validated, and the committed changes broadcast to all the designers by the multidimensional data model design collaboration engine 134. Such techniques disclosed herein enable multiple designers to concurrently work on a given virtual multidimensional data model. These techniques can further resolve potential conflicts before committing changes to the model by merging and/or validating the semantically correct unit of work objects invoked by the designers. The data model attributes characterizing the collaboratively designed virtual multidimensional data model (e.g., virtual multidimensional data model 124) can further be published (e.g., publish 140) to a multidimensional data metastore 136 to facilitate the formation of various virtual cubes (e.g., virtual cubes 126) comprising the collaboratively designed virtual multidimensional data model.

Figure 1B:
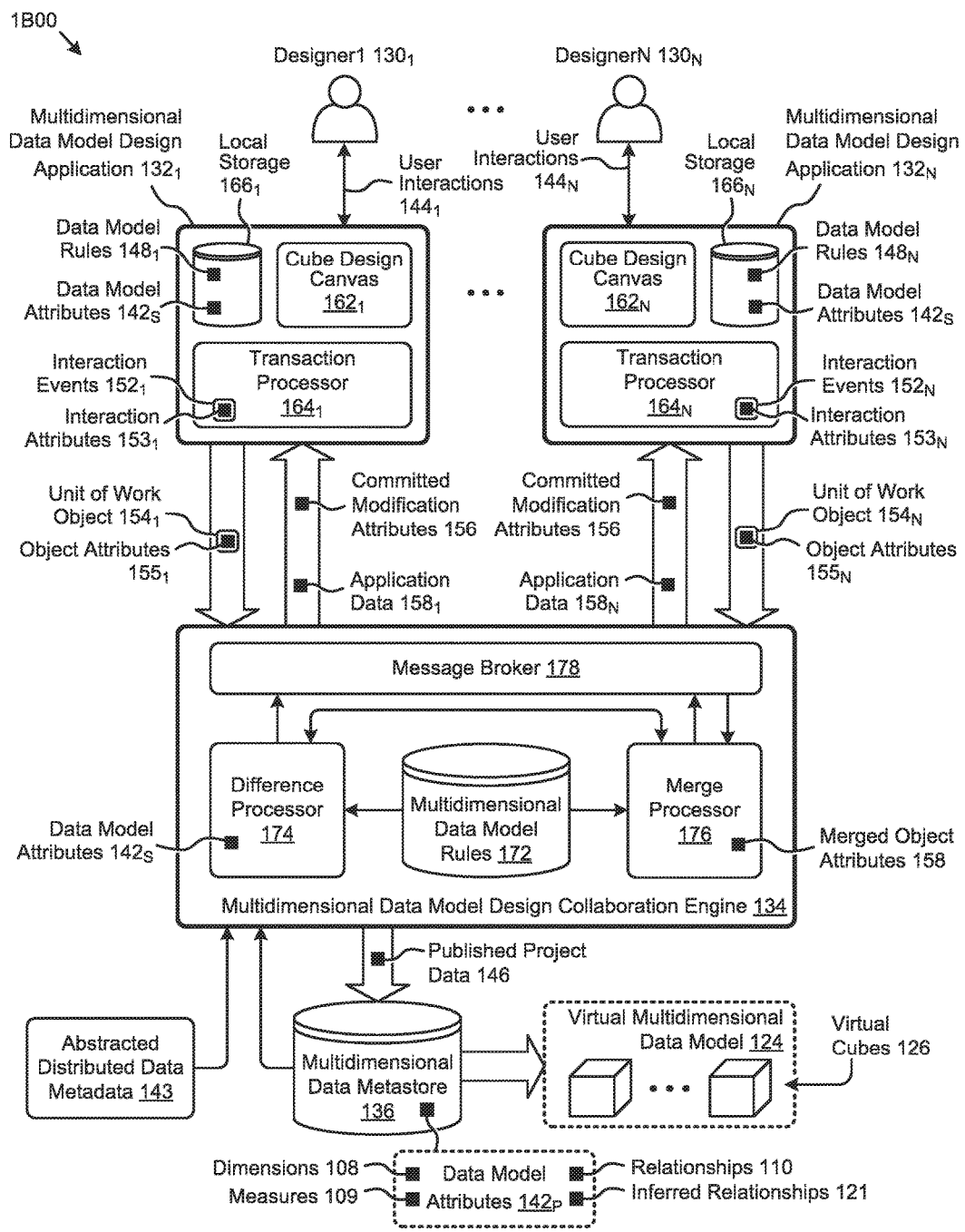
FIG. 1B shows a block diagram of a system for data model design collaboration using semantically correct collaborative objects, according to an embodiment.

One embodiment of a system for implementing the herein disclosed techniques for data model design collaboration using semantically correct collaborative objects is described as pertains to FIG. 1B.

FIG. 1B shows a block diagram 1B00 of a system for data model design collaboration using semantically correct collaborative objects, according to an embodiment. As an option, one or more instances of block diagram 1B00 or any aspect thereof may be implemented in the context of the architecture and functionality of the embodiments described herein. Also, block diagram 1B00 or any aspect thereof may be implemented in any desired environment.

The block diagram 1B00 illustrates an embodiment of the herein disclosed techniques for data model design collaboration using semantically correct collaborative objects. As shown, block diagram 1B00 comprises the components described in FIG. 1A with more details to further describe the herein disclosed techniques and approach. Other components and/or operation partitioning are possible. Specifically, each instance of the multidimensional data model design application is shown to further comprise a cube design canvas (e.g., cube design canvas $162_1, \ldots,$ cube design canvas $162_N$), a transaction processor (e.g., transaction processor $164_1, \ldots,$ transaction processor $164_N$), and a local storage facility (e.g., local storage $166_1, \ldots,$ local storage $166_N$). The multidimensional data model design collaboration engine 134 is also shown to further comprise a difference processor 174, a merge processor 176, a message broker 178, and a set of multidimensional data model rules 172. Various data flows, data structures, and data messages among the components in the block diagram 1B00 are also shown.

More specifically, the data model designers (e.g., designer1 $130_1, \ldots,$ designerN $130_N$) can use the cube design canvas to view and/or interact with various representations of a selected instance (e.g., latest version) of a collaboratively designed virtual multidimensional data model characterized by an associated set of data model attributes $142_S$. In some cases, the data model attributes $142_S$ might be transmitted from the multidimensional data model design collaboration engine 134 to the multidimensional data model design application for local storage in respective sets of application data (e.g., application data $158_1, \ldots,$ application data $158_N$) upon launch of the application and/or loading of a certain data model design project. A given designer might interact (e.g., see user interactions $144_1, \ldots,$ user interactions $144_N$) with certain elements (e.g., links, buttons, drag-and-drop items, drop-down selectors, etc.) in the cube design canvas to produce interaction events (e.g., interaction events $152_1, \ldots,$ interaction events $152_N$) characterized by various sets of interaction attributes (e.g., interaction attributes $153_1, \ldots,$ interaction attributes $153_N$). For example, the user interactions and associated interaction events might correspond to one or more design operations invoked by the designer. The transaction processor can apply the interaction attributes to a local set of data model rules (e.g., data model rules $148_1, \ldots,$ data model rules $148_N$) to determine certain actions. In some cases, such data model rules might be derived from some or all of the multidimensional data model rules 172 and transmitted (e.g., in the application data) to the multidimensional data model design application for local storage upon launch of the application and/or loading of a certain data model design project. The data model rules and/or multidimensional data model rules 172 in part define the characteristics (e.g., syntactic rules, semantic rules, etc.) of semantically correct representations (e.g., programming objects) of various aspects of the collaboratively designed virtual multidimensional data model. The various instances of the data model rules and/or the multidimensional data model rules 172 can further define rules for managing multiple designers and/or objects in a collaborative environment. For example, rules and/or logic related to access privileges, conflict resolution, batch processing, and/or other topics can be included in the instances of the data model rules and/or the multidimensional data model rules 172.

Specifically, applying the interaction attributes to the data model rules might invoke a local response that does not affect the other designers and/or the data model attributes.

For example, the interaction attributes might indicate the designer wants to move a window in the designer's cube design canvas merely resulting in a local re-rendering of the designer's cube design canvas with new coordinates for the subject window. In other cases, the interaction attributes might trigger a design transaction comprising multiple associated operations that generate a unit of work object (e.g., unit of work object $154_1$, . . . , unit of work object $154_N$) described by certain object attributes (e.g., object attributes $155_1$, . . . , object attributes $155_N$). In such cases, the data model rules might specify the scope of the associated operations, the syntax and/or semantics of the unit of work object, and/or other characteristics corresponding to the received interaction attributes. For example, the interaction attributes might indicate the designer wants to create a new dimension for the collaboratively designed virtual multidimensional data model characterized by the data model attributes $142_S$. In this case, the data model rules can specify the additional interaction attributes (e.g., dimension name) that may be required from the designer, the semantically correct structure of the dimension object, the minimum attributes that may be required for a valid dimension object, and/or other characteristics defining a semantically correct unit of work object. When any design transaction impacting the collaborative environment is complete, the object attributes associated with the unit of work object can be submitted to the multidimensional data model design collaboration engine 134 for processing. In some embodiments, certain components (e.g., one or more object attributes) comprising a given unit of work object can be transmitted (e.g., using a WebSocket protocol) to the multidimensional data model design collaboration engine 134 in sequence as each component is created, followed by a transaction end signal issued when the unit of work object generation is complete.

Processing at the multidimensional data model design collaboration engine 134 can include receiving, merging, and validating the object attributes associated with the unit of work objects invoked by the data model designers to determine a set of committed changes (e.g., committed modification attributes 156) to broadcast to all the designers in the collaboration environment. Specifically, the merge processor 176 can merge the object attributes comprising various semantically correct instances of the unit of work objects received (e.g., at the message broker 178) from various respective designers to determine a set of merged object attributes 158 that, in turn, can be used to determine the committed modification attributes 156. In some cases, the received unit of work objects might have no associated merge conflicts to resolve. In other cases, unit of work objects concurrently generated by different designers can exhibit conflicts when merged. In such cases, the merge processor might use the multidimensional data model rules 172 to resolve the conflicts. As an example, two designers might change a certain factor of an existing calculated measure to different numbers such that one or more of the object attributes representing each change will conflict when merged. In this case, the multidimensional data model rules 172 and/or other rules might indicate the last unit of work object received overrides any previous conflicting unit of work objects. Resolving other merge conflicts might require validation (e.g., according to the multidimensional data model rules 172) of various merge scenarios of the object attributes corresponding to the conflicting unit of work objects to determine the instance of the merged object attributes 158 to be used to derive the committed modification attributes 156.

In some embodiments, the difference processor 174 can determine the committed modification attributes 156 based on a set of differences between the merged object attributes 158 and the selected instance (e.g., latest version) of the data model attributes (e.g., data model attributes $142_S$). By including merely the differences between the merged object attributes 158 and the data model attributes $142_S$ in deriving the committed modification attributes 156, the data model design change latency and/or computing resource capacity when implementing the herein disclosed techniques can be reduced. When the committed modification attributes 156 have been determined, the message broker 178 can broadcast the committed modification attributes 156 to the data model designers in the collaborative environment. For example, the message broker 178 might operate as a publisher-subscriber message broker, where the "publisher" represents the source (e.g., one or more designers) of the committed modification attributes 156, and the "subscriber" represents the recipients (e.g., one or more collaborating designers) to receive the broadcast instances of the committed modification attributes 156. Each designer can then use the cube design canvas to view and/or interact with various representations of a modified instance of the collaboratively designed virtual multidimensional data model (e.g., modified virtual multidimensional data model) that is characterized by a modified instance of the data model attributes that includes the committed modification attributes 156. In some embodiments, a set of published project data 146 comprising a production instance of the data model attributes (e.g., data model attributes $142_P$) characterizing the collaboratively designed multidimensional data model (e.g., virtual multidimensional data model 124) can be published to the multidimensional data metastore 136 to facilitate the formation of various virtual cubes (e.g., virtual cubes 126). In some cases, the published project data 146 can be structured in an XML format. The virtual cubes 126 can be characterized by certain instances of dimensions 108, measures 109, relationships 110 (e.g., explicit relationships), inferred relationships 121, dependencies, and/or other characteristics described by the data model attributes $142_P$. In some cases, the data model designers can define the dimensions 108, measures 109, relationships 110, and/or inferred relationships 121 based at least in part on information comprising a set of abstracted distributed data metadata 143 (e.g., abstracted from the distributed data metastore 113 by the query planner 120 in FIG. 1A). In some cases, the abstracted distributed data metadata 143 can be provided in the application data at launch and/or project load. The data model designers can further define one or more instances of the virtual cubes 126 using the techniques disclosed herein. In other cases, one or more instances of the virtual cubes 126 can be determined at query time (e.g., by the query planner 120 in FIG. 1A).

Further details related to generation and use of a virtual multidimensional data model are disclosed in U.S. patent application Ser. No. 14/665,032, entitled "INTERPRETING RELATIONAL DATABASE STATEMENTS USING A VIRTUAL MULTIDIMENSIONAL DATA MODEL" filed on Mar. 23, 2015, the contents of which is hereby incorporated by reference in its entirety in the present application.

Figure 2:
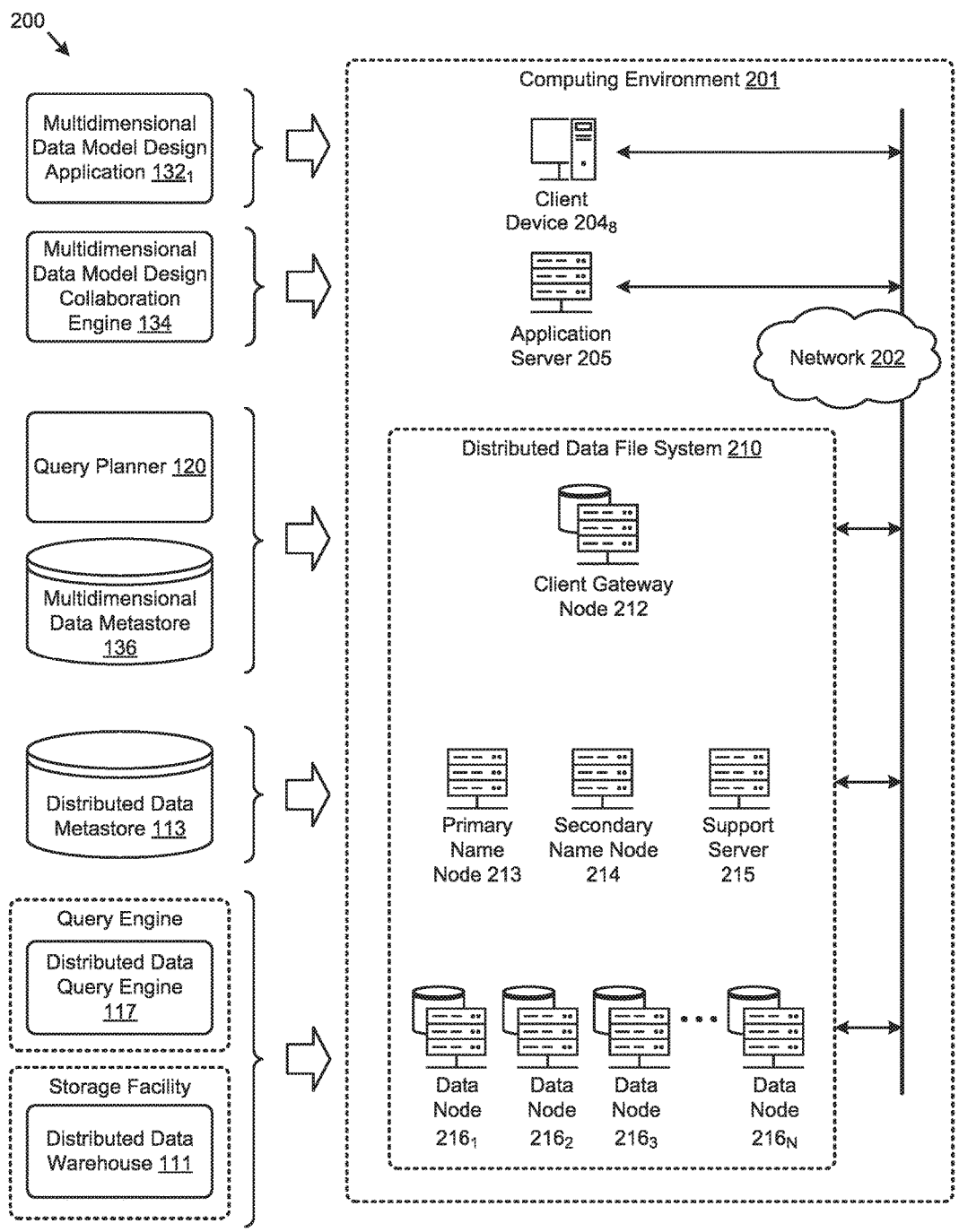
FIG. 2 is a schematic of an environment for implementing a system for data model design collaboration using semantically correct collaborative objects, according to an embodiment.

One embodiment of an environment for implementing the foregoing system and herein disclosed techniques is described in FIG. 2.

FIG. 2 is a schematic 200 of an environment for implementing a system for data model design collaboration using semantically correct collaborative objects, according to an embodiment. As an option, one or more instances of schematic 200 or any aspect thereof may be implemented in the context of the architecture and functionality of the embodiments described herein. Also, the schematic 200 or any aspect thereof may be implemented in any desired environment.

As shown in FIG. 2, a computing environment 201 comprises one or more instances of a client device $204_8$ (e.g., a desktop computer), one or more instances of an application server 205, and one or more instances of a distributed data file system 210. The aforementioned devices, servers, and systems can communicate through a network 202 (e.g., a wireless network, a wide area network (WAN), a local area network (LAN), the Internet, an intranet, a private network, etc.). More specifically, the distributed data file system 210 can be configurable to store and process large volumes of data (e.g., using an HDFS framework) and comprise one or more instances of a client gateway node 212, one or more instances of a primary name node 213, one or more instances of a secondary name node 214, one or more instances of a support server 215 (e.g., executing data analysis processes, etc.), and a plurality of data nodes (e.g., data node $216_1$, data node $216_2$, data node $216_3$, to data node $216_N$). The distributed data file system 210 can be configured to store large files of data across multiple computing devices (e.g., the plurality of data nodes), rather than store all of the files on a single computing device with a large amount of storage capacity. To accommodate such distributed storage, the plurality of data nodes can be configured with one or more rack-mounted servers coupled (e.g., using SATA or SAS interconnects) to multiple solid-state drives (SSDs) and/or hard disk drives (HDDs) for storing the data. As an example, when a file is loaded into distributed data file system 210, it is replicated and partitioned into "blocks" of data, which are distributed and stored across the plurality of data nodes. The primary name node 213 is responsible for storage and management of metadata associated with the distributed data file system 210, such that, for example, the primary name node 213 can provide data location information for data processing operations. Further, other configurations, partitions, and architectures of the distributed data file system 210 shown in computing environment 201 are possible. For example, a single-node implementation may have all of the nodes (e.g., client gateway node 212, primary name node 213, the plurality of data nodes, etc.) reside on a single computing device. Also, a small cluster of two nodes may have a first computing device operate as a name node and a second computing device operate as a data node. Further, the distributed data file system 210 can represent any database management system.

In one or more embodiments, the aforementioned devices, servers, and systems in computing environment 201 can be configurable to implement techniques for data model design collaboration using semantically correct collaborative objects as described in FIG. 1A and herein. Specifically, the schematic 200 associates the components described in FIG. 1A with the client device $204_8$, the application server 205, and the distributed data file system 210 of computing environment 201. More specifically, as shown in FIG. 2, the client device $204_8$ (e.g., operated by designer1 $130_1$ in FIG. 1A) can store program instructions corresponding to the operations of the multidimensional data model design application $132_1$. Also, the application server 205 in computing environment 201 can store program instructions corresponding to the operations of the multidimensional data model design collaboration engine 134. Further, the client gateway node 212 can store program instructions corresponding to the operations of the query planner 120. The multidimensional data metastore 136 can also be stored in a storage facility (e.g., one or more SSDs and/or HDDs) coupled to the client gateway node 212. Further, the distributed data metastore 113 can be stored in a storage facility (e.g., one or more SSDs and/or HDDs) coupled to the primary name node 213. The data and databases distributed across the plurality of data nodes can be operated over by a query engine such as distributed data query engine 117 that communicates with a storage facility such as the distributed data warehouse 111.

Figure 3:
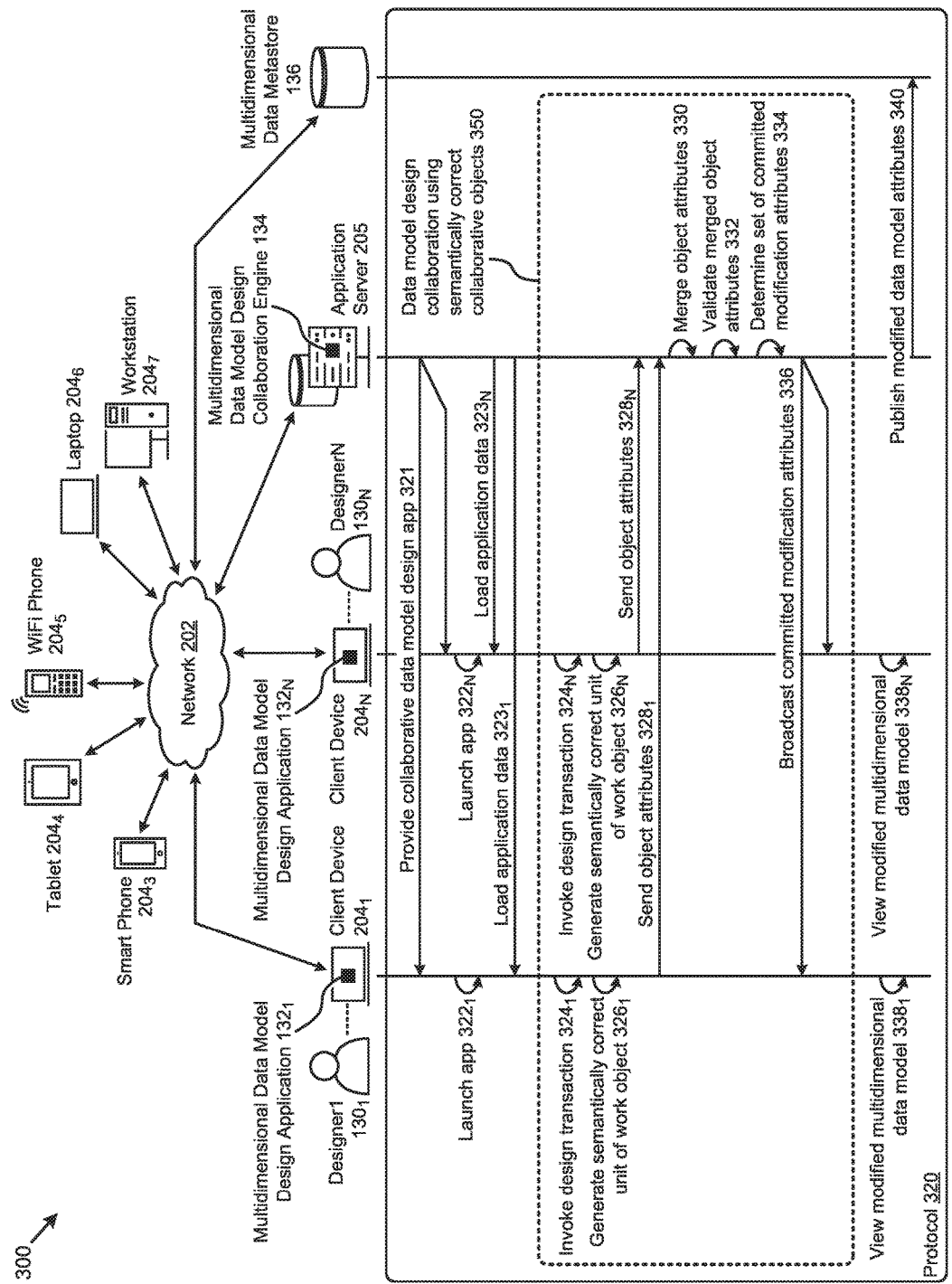
FIG. 3 depicts an environment that can support embodiments of a protocol for data model design collaboration using semantically correct collaborative objects, according to an embodiment.

Another embodiment and arrangement of certain components described in FIG. 2 for supporting a protocol for implementing the herein disclosed techniques is described as pertains to FIG. 3.

FIG. 3 is an environment 300 that can support embodiments of a protocol for data model design collaboration using semantically correct collaborative objects. As an option, one or more variations of environment 300 or any aspect thereof may be implemented in the context of the architecture and functionality of the embodiments described herein. Also, the environment 300 or any aspect thereof may be implemented in any environment.

As shown in FIG. 3, the environment 300 comprises various computing systems (e.g., servers and devices) interconnected by the network 202. The network 202 can comprise any combination of a wide area network (e.g., WAN), local area network (e.g., LAN), cellular network, wireless LAN (e.g., WLAN), or any such means for enabling communication of computing systems. The network 202 can also be referred to as the Internet. More specifically, environment 300 can comprise at least one instance of the earlier described application server 205 and multidimensional data metastore 136. As shown, an instance of the multidimensional data model design collaboration engine 134 can operate on the application server 205. The environment 300 further comprises instances of client devices (e.g., client device $204_1$, . . . , client device $204_N$) that can represent one of a variety of other computing devices (e.g., a smart phone $204_3$, a tablet $204_4$, a WiFi phone $204_5$, a laptop $204_6$, a workstation $204_7$, etc.) having software (e.g., multidimensional data model design application $132_1$, multidimensional data model design application $132_N$, etc.) and hardware (e.g., a graphics processing unit, display, monitor, etc.) capable of processing and displaying information (e.g., web page, graphical user interface, etc.) on a display. For example, the multidimensional data model design application might operate in a browser on the client devices. The client devices can further communicate information (e.g., web page request, user activity, electronic files, computer files, etc.) over the network 202. As shown, the client device $204_1$ can be operated by the designer1 $130_1$ and the client device $204_N$ can be operated by the designerN $130_N$.

In one or more embodiments, the client device $204_1$, the client device $204_N$, the application server 205, and the multidimensional data metastore 136 can exhibit a set of high-level interactions (e.g., operations, messages, etc.) in a protocol 320. Specifically, as shown, instances of the multidimensional data model design application can be provided by the application server 205 for operation on the client devices to, in part, facilitate collaborative data model design using semantically correct collaborative objects (see message 321). The multidimensional data model design application $132_1$ can be launched at the client device $204_1$ (see operation $322_1$) and the multidimensional data model design application $132_N$ can be launched at the client device $204_N$ (see operation $322_N$). Launching the application might cause certain sets of application data and/or project data (e.g., comprising a selected instance of data model attributes characterizing a collaboratively designed virtual multidimensional data model) to be loaded from the application server 205 to the plurality of client devices to enable the data model designers to perform various design operations (see message $323_1$ and message $323_N$).

As highlighted in the protocol 320, a grouping 350 can represent one embodiment of certain messages and/or operations used in systems and protocols for data model design collaboration using semantically correct collaborative objects. Specifically, such a grouping of interactions might commence with designer1 $130_1$ interacting with the multidimensional data model design application $132_1$ to invoke a design transaction (see operation $324_1$) that can generate a semantically correct unit of work object corresponding to the interaction (see operation $326_1$). For example, designer1 $130_1$ might click a "Create new dimension" button in the multidimensional data model design application $132_1$ that invokes a design transaction to generate a unit of work object that characterizes the new dimension associated with the virtual multidimensional data model. Further, designerN $130_N$ might interact with the application to invoke a design transaction (see operation $324_N$) that can generate a semantically correct unit of work object corresponding to the interaction (see operation $326_N$). For example, designerN $130_N$ might modify an existing calculated measure associated with the virtual multidimensional data model such that a design transaction is invoked to generate a unit of work object that characterizes the changes to the calculated measure. In some cases, such design transactions can be concurrently invoked by multiple designers. When the respective transactions invoked by the designers are complete (e.g., the semantically correct unit of work objects are complete), a set of object attributes characterizing the unit of work objects can be transmitted to the application server 205 (see message $328_1$ and message $328_N$). In some embodiments, certain components (e.g., one or more object attributes) comprising a given unit of work object can be transmitted to the multidimensional data model design collaboration engine 134 at the application server 205 (e.g., using a WebSocket protocol) in sequence as the components are created, followed by a transaction end signal issued when the unit of work object generation is complete.

Certain batches of received object attributes can be merged (see operation 330) and/or validated (see operation 332) to determine a set of attributes (e.g., committed modification attributes) characterizing the data model changes to be committed to the collaborative environment (see operation 334). In some cases, the committed modification attributes can be based on a set of differences between the merged object attributes and the selected instance of the data model attributes to reduce the data model design change latency and/or computing resource capacity. When the committed modification attributes have been determined, the committed modification attributes can be broadcast by the application server 205 to the designers with access to the collaborative environment (see message 336). Each designer can then view and/or interact with various representations of a modified instance of the virtual multidimensional data model (e.g., modified virtual multidimensional data model) characterized by a modified instance of the data model attributes that includes the committed modification attributes (see operation $338_1$ and operation $338_N$). In some embodiments, the modified instance of the data model attributes characterizing the modified virtual multidimensional data model can be published to the multidimensional data metastore 136 (see message 340).

Figure 4A:
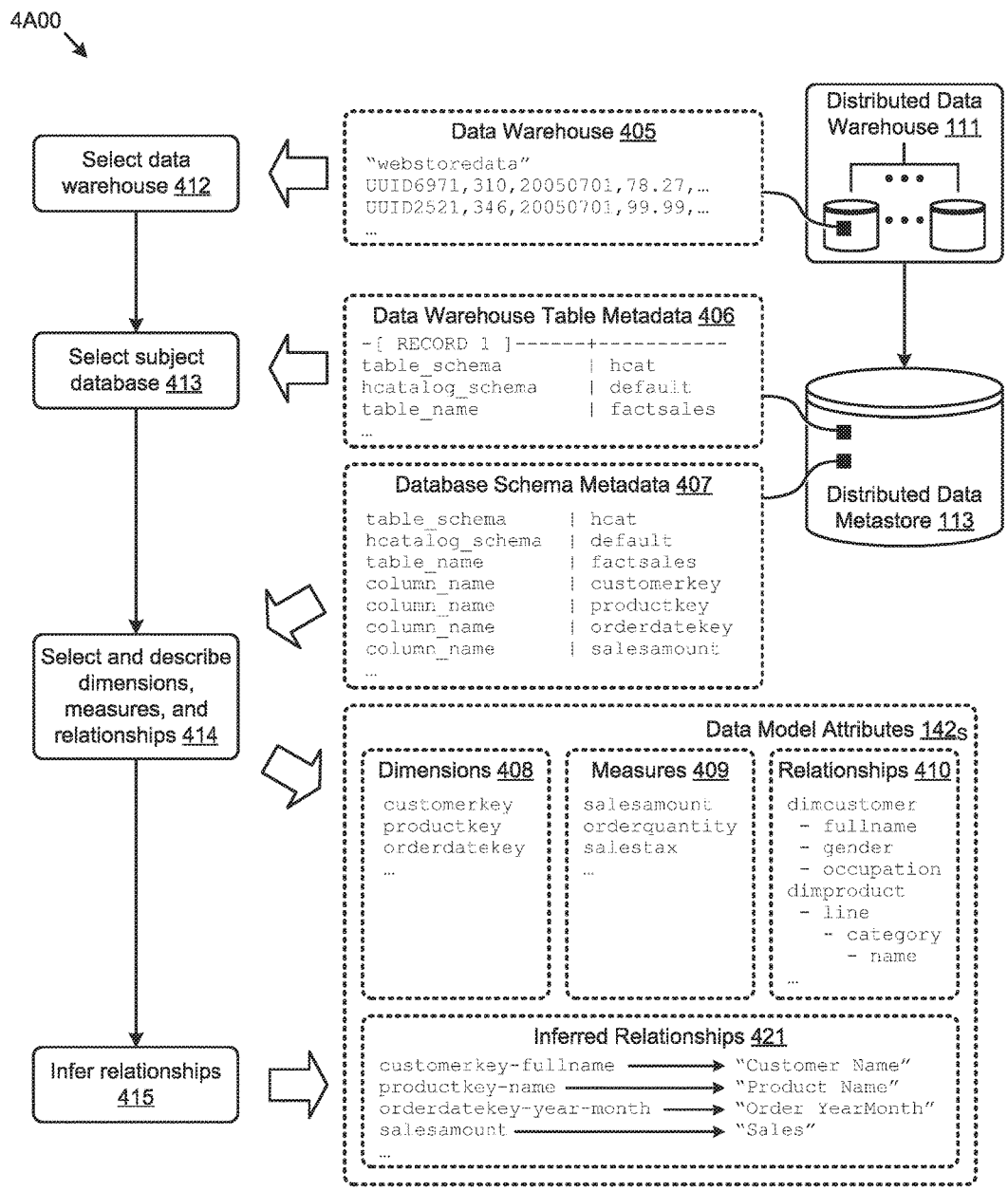
FIG. 4A presents a multidimensional data model attribute selection technique facilitated by systems for data model design collaboration using semantically correct collaborative objects, according to an embodiment.
Figure 4B:
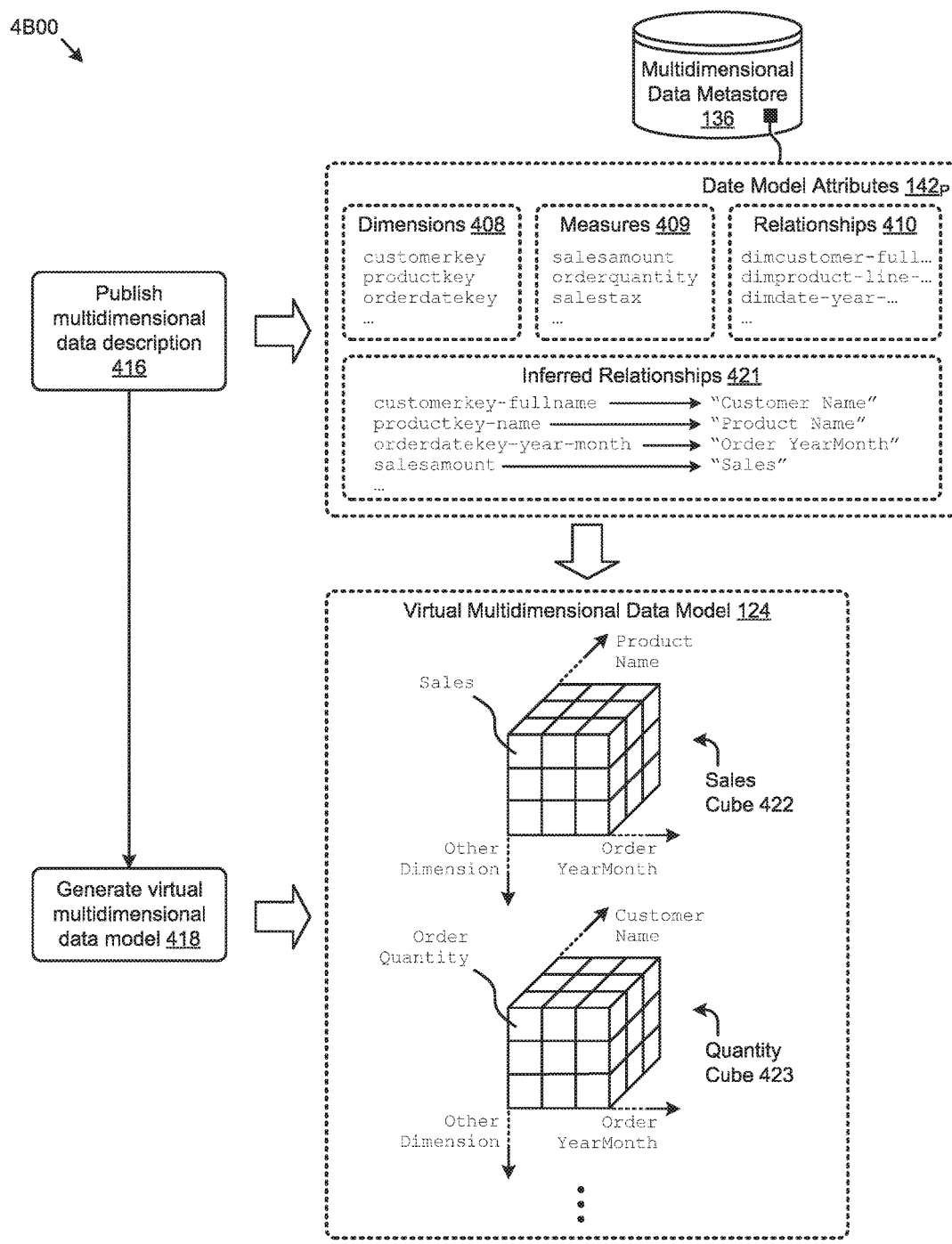
FIG. 4B illustrates a virtual multidimensional data model generation technique using information delivered by systems for data model design collaboration using semantically correct collaborative objects, according to an embodiment.

One embodiment of the techniques for generating the foregoing data model attributes and/or virtual multidimensional data model is described as pertains to FIG. 4A and FIG. 4B.

FIG. 4A presents a multidimensional data model attribute selection technique 4A00 facilitated by systems for data model design collaboration using semantically correct collaborative objects, according to an embodiment. As an option, one or more instances of multidimensional data model attribute selection technique 4A00 or any aspect thereof may be implemented in the context of the architecture and functionality of the embodiments described herein. Also, the multidimensional data model attribute selection technique 4A00 or any aspect thereof may be implemented in any desired environment.

The multidimensional data model attribute selection technique 4A00 presents one embodiment of a set of steps and associated examples for determining data model attributes associated with a multidimensional data model representation of a subject database. In one or more embodiments, the steps and underlying operations comprising the multidimensional data model attribute selection technique 4A00 can be invoked by any one of the earlier described collaborative data model designers using the herein disclosed techniques. Specifically, the multidimensional data model attribute selection technique 4A00 can commence with selecting a data warehouse 405 from available (e.g., connected) data warehouses, such as the distributed data warehouse 111 (see step 412). For example, as shown, the data warehouse "webstoredata" comprising comma-delimited flat file data can be selected. In one or more embodiments, the data comprising the data warehouse can be distributed across multiple computing devices and/or storage devices (e.g., in an HDFS). The multidimensional data model attribute selection technique 4A00 can continue with selecting a subject database from the data warehouse (see step 413). For example, the subject database "fact sales" can be selected from the data warehouse table metadata 406 stored in the distributed data metastore 113 (e.g., a Hive metastore). The multidimensional data model attribute selection technique 4A00 can continue with selecting and describing the dimensions, measures, and relationships (see step 414) desired to be included in a multidimensional analysis of the selected subject database. For example, as shown, a set of dimensions 408 comprising "customerkey", "productkey" and "orderdatekey", and a set of measures 409 comprising "salesamount", "orderquantity", and "salestax" can be selected from the database schema metadata 407 from the distributed data metastore 113.

In some cases, a set of relationships 410 (e.g., references, levels, hierarchies, etc.) can be associated with one or more dimensions. As an example, the selected dimension "customerkey" may have an associated "dimcustomer" dimension structure comprising customer "fullname", customer "gender", and customer "occupation". As another example, the selected dimension "productkey" may have an associated "dimproduct" dimension hierarchy comprising product "line", product "category", and product "name". As another example, the selected dimension "orderdatekey" may have an associated "dimdate" dimension hierarchy comprising order "year", order "month", and order "day". In some embodiments, such dimensions and/or relationships can be defined in tables associated with the subject database in the data warehouse. In other embodiments, the dimensions and/or relationships can be defined by the data model designer. Further, some measures can be calculated measures. For example, "salestax" may be calculated from the product of the measure "salesamount" and another measure "taxrate". Describing the dimensions, measures, and relationships can include mapping names to descriptions, among other operations. For example, the measure "salesamount" can be assigned the name "Sales". As shown, the multidimensional data model attribute selection technique 4A00 can further infer certain relationships associated with instances of the dimensions 408, instances of the measures 409, and/or instances of the relationships 410 (see step 415). For example, the dimension "orderdatekey" and associated data hierarchy of "year" to "month" can be captured in a single attribute named "Order YearMonth", as shown in a set of inferred relationships 421. Other possible explicit and inferred relationships associated with the dimensions and/or measures can also be flagged and assigned an identifier, reference, level, and/or other attributes.

As merely one example, the dimensions 408, the measures 409, the relationships 410, the inferred relationships 421, and/or other attributes can comprise a selected instance of data model attributes (e.g., data model attributes $142_S$) that can facilitate the formation of various virtual cubes comprising a collaboratively designed virtual multidimensional data model. FIG. 4B describes one embodiment of the techniques for generating a virtual multidimensional data model and associated virtual cubes from such data model attributes.

FIG. 4B illustrates a virtual multidimensional data model generation technique 4B00 using information delivered by systems for data model design collaboration using semantically correct collaborative objects, according to an embodiment. As an option, one or more instances of virtual multidimensional data model generation technique 4B00 or any aspect thereof may be implemented in the context of the architecture and functionality of the embodiments described herein. Also, the virtual multidimensional data model generation technique 4B00 or any aspect thereof may be implemented in any desired environment.

The virtual multidimensional data model generation technique 4B00 presents one embodiment of a set of steps and associated examples for generating a virtual multidimensional data model and associated virtual cubes representing a subject database using information delivered by systems for data model design collaboration using semantically correct collaborative objects. Specifically, the virtual multidimensional data model generation technique 4B00 can commence with publishing the data model attributes $142_P$ to the multidimensional data metastore 136 (see step 416). For example, the data model attributes $142_P$ might comprise a production instance (e.g., release to production version) of the data model attributes selected by a set of collaborating data model designers. The virtual multidimensional data model generation technique 4B00 can continue with generating a virtual multidimensional data model (e.g., virtual multidimensional data model 124) based at least in part on the dimensions 408, the measures 409, the relationships 410, the inferred relationships 421, and/or other attributes comprising the data model attributes $142_P$ (see step 418). In some cases, the virtual multidimensional data model 124 can comprise multiple virtual cubes representing various multidimensional views of the underlying subject database (e.g., database "fact sales" in FIG. 4A). Specifically, as shown, the virtual multidimensional data model 124 can comprise a sales cube 422 and a quantity cube 423. The sales cube 422 can be defined by the dimensions "Product Name", "Order YearMonth", and "Other Dimension" (e.g., geographic region), with each cell holding a "Sales" amount for a respective combination of dimension values (e.g., "WidgetA", "2014-January", and "North America", respectively). The quantity cube 423 can be defined by the dimensions "Customer Name", "Order YearMonth", and "Other Dimension" (e.g., geographic region), with each cell holding an "Order Quantity" amount for a respective combination of dimension values. Any number of virtual cubes having any number of dimensions and measures can be included in the virtual multidimensional data model 124. Further, in one or more embodiments, the virtual cubes can be predetermined and/or dynamically generated based at least in part on an issued query. Generation of the virtual cubes and the virtual multidimensional data model 124 can also be by any algorithm, including algorithms running on static or dynamic rulesets, machine learning algorithms, and/or any other suitable algorithm.

Figure 5A:
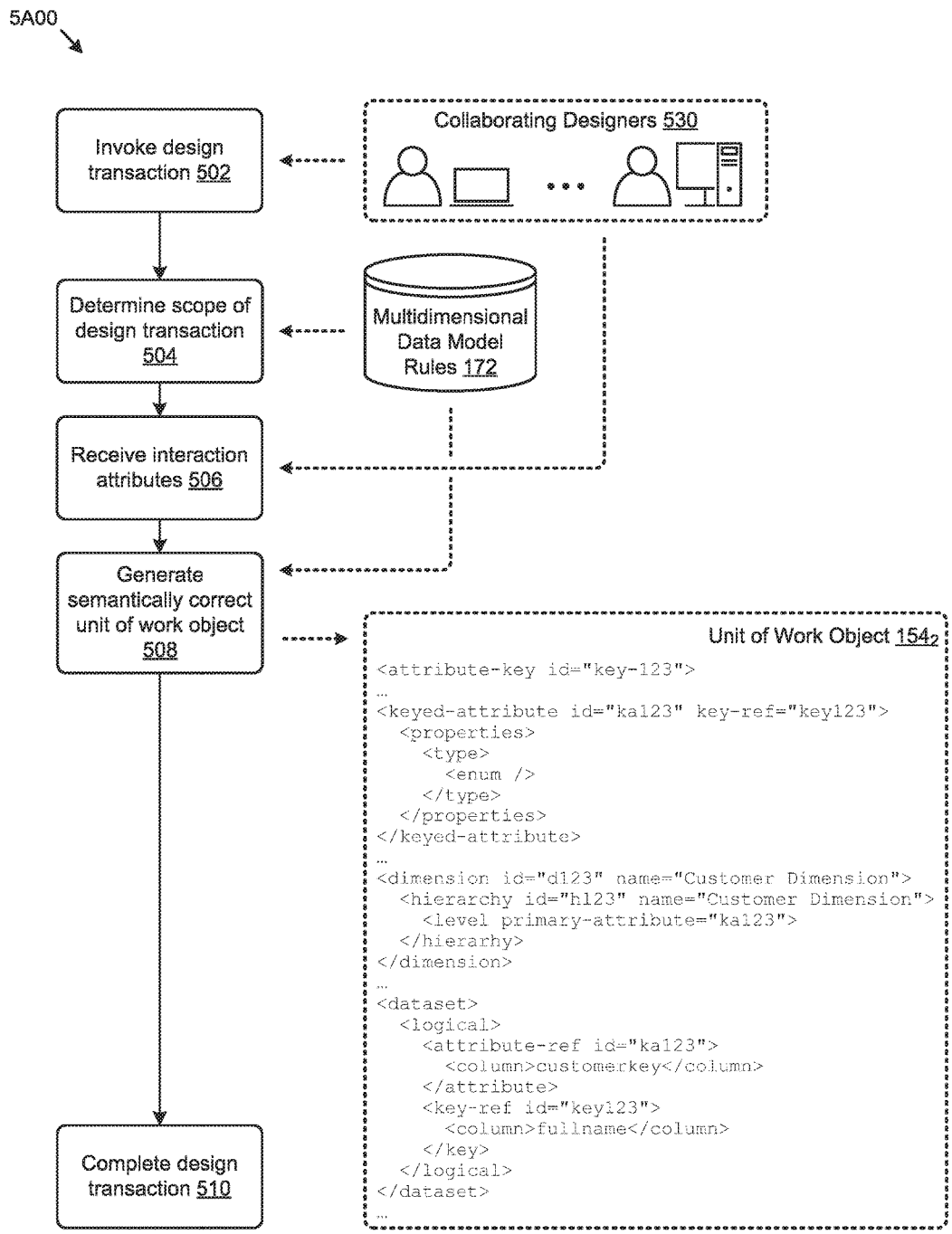
FIG. 5A shows a collaborative object generation technique used in systems for data model design collaboration using semantically correct collaborative objects, according to an embodiment.
Figure 5B:
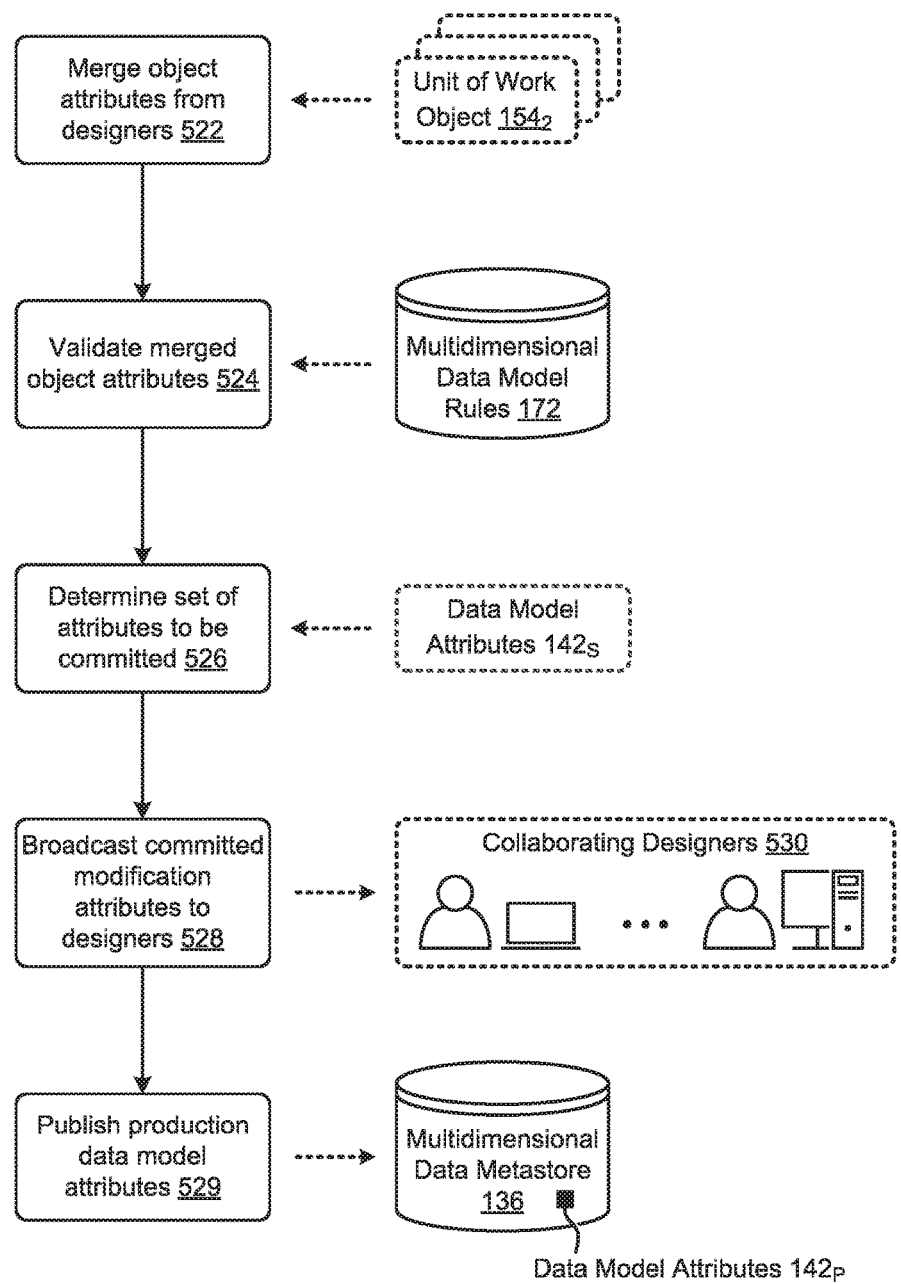
FIG. 5B shows a collaborative object commitment technique used in systems for data model design collaboration using semantically correct collaborative objects, according to an embodiment.

Further details related to generating data model attributes in a collaborative environment according to the herein disclosed techniques are described as pertaining to FIG. 5A and FIG. 5B.

FIG. 5A shows a collaborative object generation technique 5A00 used in systems for data model design collaboration using semantically correct collaborative objects, according to an embodiment. As an option, one or more instances of collaborative object generation technique 5A00 or any aspect thereof may be implemented in the context of the architecture and functionality of the embodiments described herein. Also, the collaborative object generation technique 5A00 or any aspect thereof may be implemented in any desired environment.

The collaborative object generation technique 5A00 presents one embodiment of a set of steps and associated examples for generating semantically correct collaborative objects in systems implementing the herein disclosed techniques. Specifically, the collaborative object generation technique 5A00 can commence with a design transaction being invoked by at least one designer from a group of collaborating designers 530 concurrently designing a virtual multidimensional data model (see step 502). For example, a designer might want to create, modify, and/or delete some aspect (e.g., dimension, measure, relationship, etc.) of the virtual multidimensional data model. The scope of the design transaction might then be determined based, for example, on the multidimensional data model rules 172 (see step 504). For example, the scope might be characterized by a set of operations, output structures and/or semantics, and/or other characteristics corresponding to the design transaction. In some cases, the scope of the design transaction might require one or more interaction attributes to be collected, for example, from the collaborating designers 530 (see step 506). Specifically, the designer from the collaborating designers 530 invoking the design transaction might be required to enter and/or select various attributes pertaining to the specific design transaction invoked. For example, a dimension name might need to be specified by the designer to create a valid dimension.

When a valid set of interaction attributes are received, one or more semantically correct unit of work objects can be generated (see step 508). In some cases, the unit of work object can be semantically correct when conformed to certain aspects of the multidimensional data model rules 172. For example, the shown instance of a unit of work object $154_2$ for a created dimension (e.g., "customer Dimension") can be structured according to the multidimensional data model rules 172. Specifically, the rules might specify the unit of work object are to have an XML-based structure having the shown tag taxonomy (e.g., <dimension> . . . </dimension>, <dataset> . . . </dataset>, etc.). Further, the rules might specify that the dimension object are to contain a hierarchy attribute and a level attribute pointing to a valid keyed-attribute as its primary-attribute. Other syntactical and/or semantical characteristics of the unit of work object $154_2$ might be needed to create a valid dimension. When the unit of work object (e.g., unit of work object $154_2$) corresponding to the invoked design transaction has been generated, the design transaction can be deemed completed (see step 510). In some cases, a message and/or signal indicating the completion of the transaction can be issued to various components of systems implementing the collaborative object generation technique 5A00.

FIG. 5B shows a collaborative object commitment technique 5B00 used in systems for data model design collaboration using semantically correct collaborative objects, according to an embodiment. As an option, one or more instances of collaborative object commitment technique 5B00 or any aspect thereof may be implemented in the context of the architecture and functionality of the embodiments described herein. Also, the collaborative object commitment technique 5B00 or any aspect thereof may be implemented in any desired environment.

The collaborative object commitment technique 5B00 presents one embodiment of a set of steps and associated examples for committing the attributes derived from one or more semantically correct collaborative objects to modifying at least one virtual multidimensional data model being collaboratively designed according to the herein disclose techniques. Specifically, the collaborative object commitment technique 5B00 can commence with merging one or more unit of work objects (e.g., unit of work object $154_2$) received from various designers collaborating on the design of the virtual multidimensional data model (see step 522). In some cases, the received unit of work objects might have no merge conflicts to resolve. In other cases, the object attributes associated with the unit of work objects concurrently generated by different designers can exhibit conflicts when merged. In such cases, the multidimensional data model rules 172 might be used to validate the merged object attributes (see step 524). Such validated merged object attributes can then be used to determine the committed modification attributes that characterize, in part, a modified instance of the collaboratively designed virtual multidimensional data model (e.g., modified virtual multidimensional data model) (see step 526). In some cases, the committed modification attributes can be based on a set of differences between the validated merged object attributes and a selected instance (e.g., latest version) of the data model attributes (e.g., data model attributes $142_S$) characterizing the collaboratively designed virtual multidimensional data model. When the committed modification attributes are determined, the committed modification attributes can be broadcast to the collaborating designers 530 (see step 528). Further, a production instance of the data model attributes (e.g., data model attributes $142_P$) characterizing the virtual multidimensional data model can be published to the multidimensional data metastore 136 (see step 529). For example the data model attributes $142_P$ might comprise a copy of the data model attributes characterizing the modified virtual multidimensional data model.

In one or more embodiments, the foregoing techniques can be implemented according to the various systems and/or environments disclosed herein. As an example, FIG. 6A, FIG. 6B, FIG. 6C, and FIG. 6D depict a series of multidimensional data model design application user interface views (e.g., cube design canvas views) from the perspective of two designers collaborating on the design of a virtual multidimensional data model according to the herein disclosed techniques.

Figure 6A:
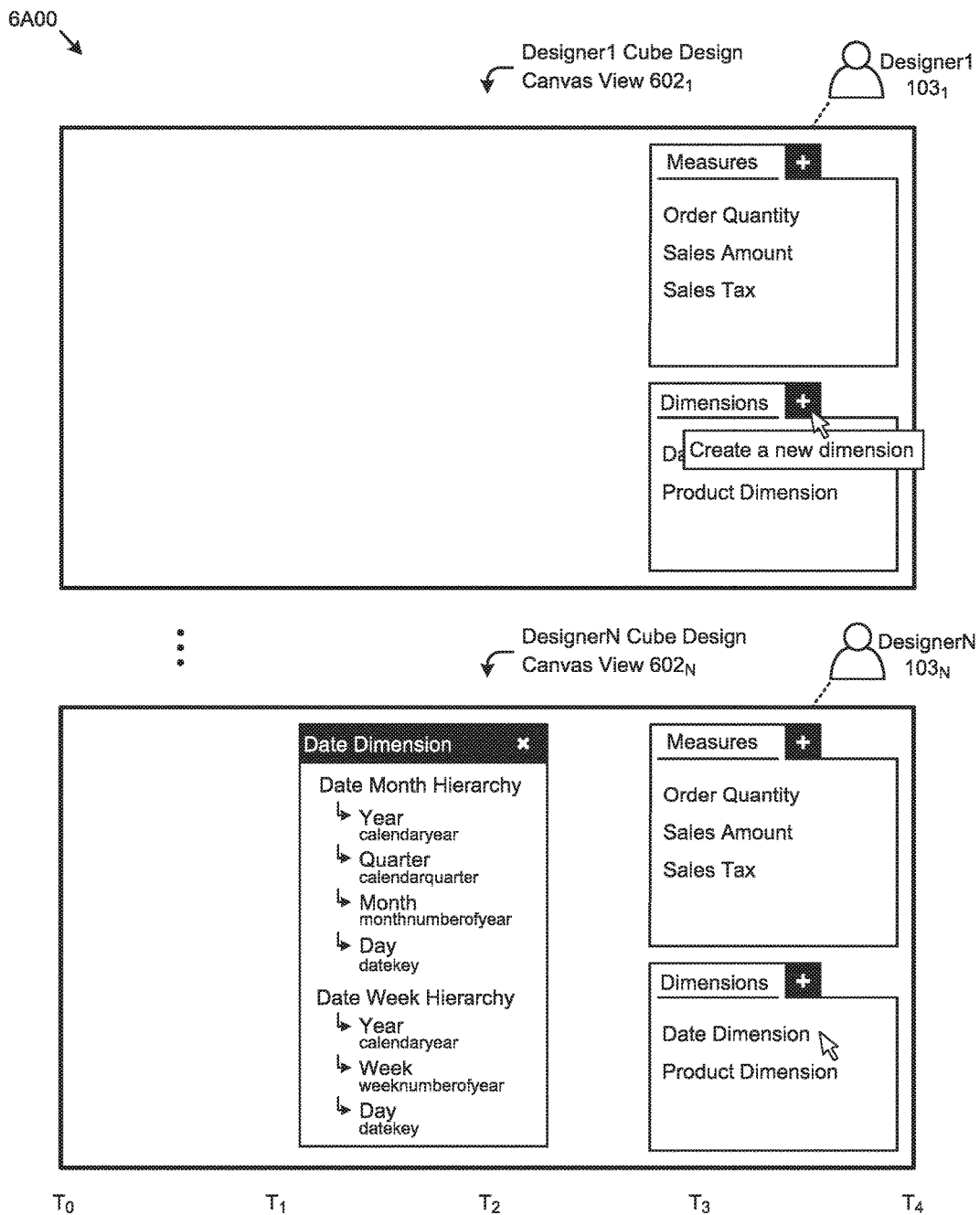
FIG. 6A depicts collaborative design interface views among collaborators invoking a design transaction in systems for data model design collaboration using semantically correct collaborative objects, according to an embodiment.

FIG. 6A depicts collaborative design interface views 6A00 among collaborators invoking a design transaction in systems for data model design collaboration using semantically correct collaborative objects, according to an embodiment. As an option, one or more instances of collaborative design interface views 6A00 or any aspect thereof may be implemented in the context of the architecture and functionality of the embodiments described herein. Also, the collaborative design interface views 6A00 or any aspect thereof may be implemented in any desired environment.

As shown, FIG. 6A comprises a designer1 cube design canvas view $602_1$ and a designerN cube design canvas view $602_N$ seen at a time $T_1$ by designer1 $130_1$ and designerN $130_N$, respectively, where designer1 $130_1$ and designerN $130_N$ are collaborating on a selected virtual multidimensional data model. The "Measures" and "Dimensions" shown in both views are the same for each designer since the designers are collaborating on the same virtual multidimensional data model. Other characteristics of the views can be different. For example, designerN $130_N$ has opened a "Date Dimension" window for viewing details pertaining to the "Date Dimension", while designer1 $130_1$ has not opened a "Date Dimension" window. As further shown, designer1 $130_1$ has moused over the "+" button with an intention to "Create a new dimension" (e.g., by clicking the "+" button). In this case, designerN $130_N$ has no visual indication in the designerN cube design canvas view $602_N$ that designer1 $130_1$ intends to create a new dimension for the selected virtual multidimensional data model.

Figure 6B:
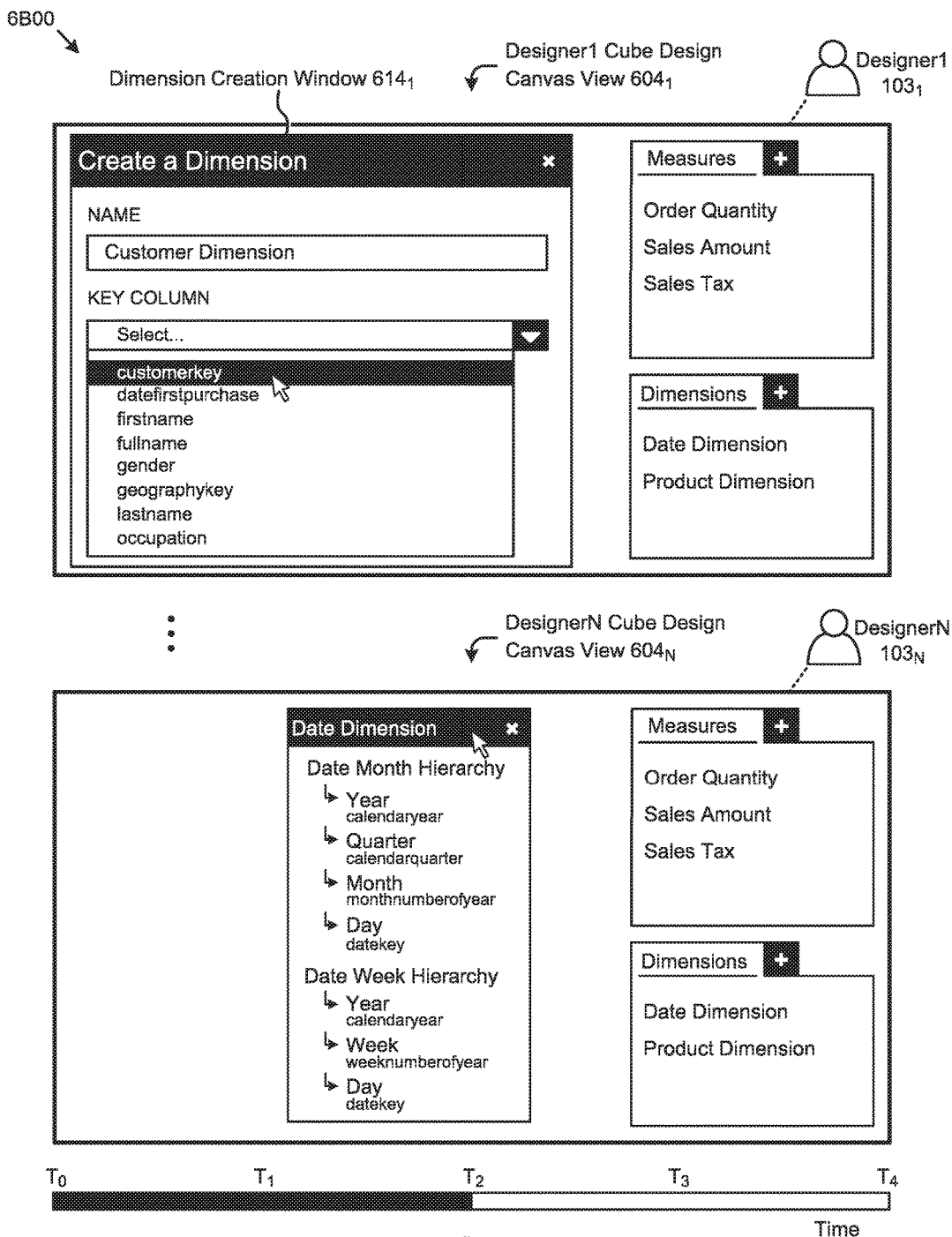
FIG. 6B depicts collaborative design interface views among collaborators selecting interaction attributes in systems for data model design collaboration using semantically correct collaborative objects, according to an embodiment.

FIG. 6B depicts collaborative design interface views 6B00 among collaborators selecting interaction attributes in systems for data model design collaboration using semantically correct collaborative objects, according to an embodiment. As an option, one or more instances of collaborative design interface views 6B00 or any aspect thereof may be implemented in the context of the architecture and functionality of the embodiments described herein. Also, the collaborative design interface views 6B00 or any aspect thereof may be implemented in any desired environment.

As shown, FIG. 6B comprises a designer1 cube design canvas view $604_1$ and a designerN cube design canvas view $604_N$ seen at a time $T_2$ by designer1 $130_1$ and designerN $130_N$, respectively, where designer1 $130_1$ and designerN $130_N$ are collaborating on the selected virtual multidimensional data model. As indicated by the shown progress bar, the time $T_2$ occurs later than the time $T_1$ corresponding to the views in FIG. 6A. Responsive to designer1 $130_1$ interacting with the cube design canvas to invoke the creation of a new dimension (e.g., see FIG. 6A), a dimension creation window $614_1$ is rendered in the designer1 cube design canvas view $604_1$, but not rendered in the designerN cube design canvas view $604_N$. According to the herein disclosed techniques, a design transaction might also be invoked by the interaction from designer1 $130_1$. In such cases, for example, certain interaction attributes (e.g., "NAME", "KEY COLUMN", etc.) might be requested from the designer1 $103_1$ to build a semantically correct collaborative object associated with the design transaction. As shown, designer1 $130_1$ might enter the name "Customer Dimension" and select the key column "customerkey". The designerN $130_N$ might have also concurrently moved the cursor to the top of the "Date Dimension" window with the intent to drag it to a new location. No visual indication of the interactions from other designers is displayed in each designer's respective view since no unit of work objects have been generated for broadcasting to the collaborating designers.

Figure 6C:
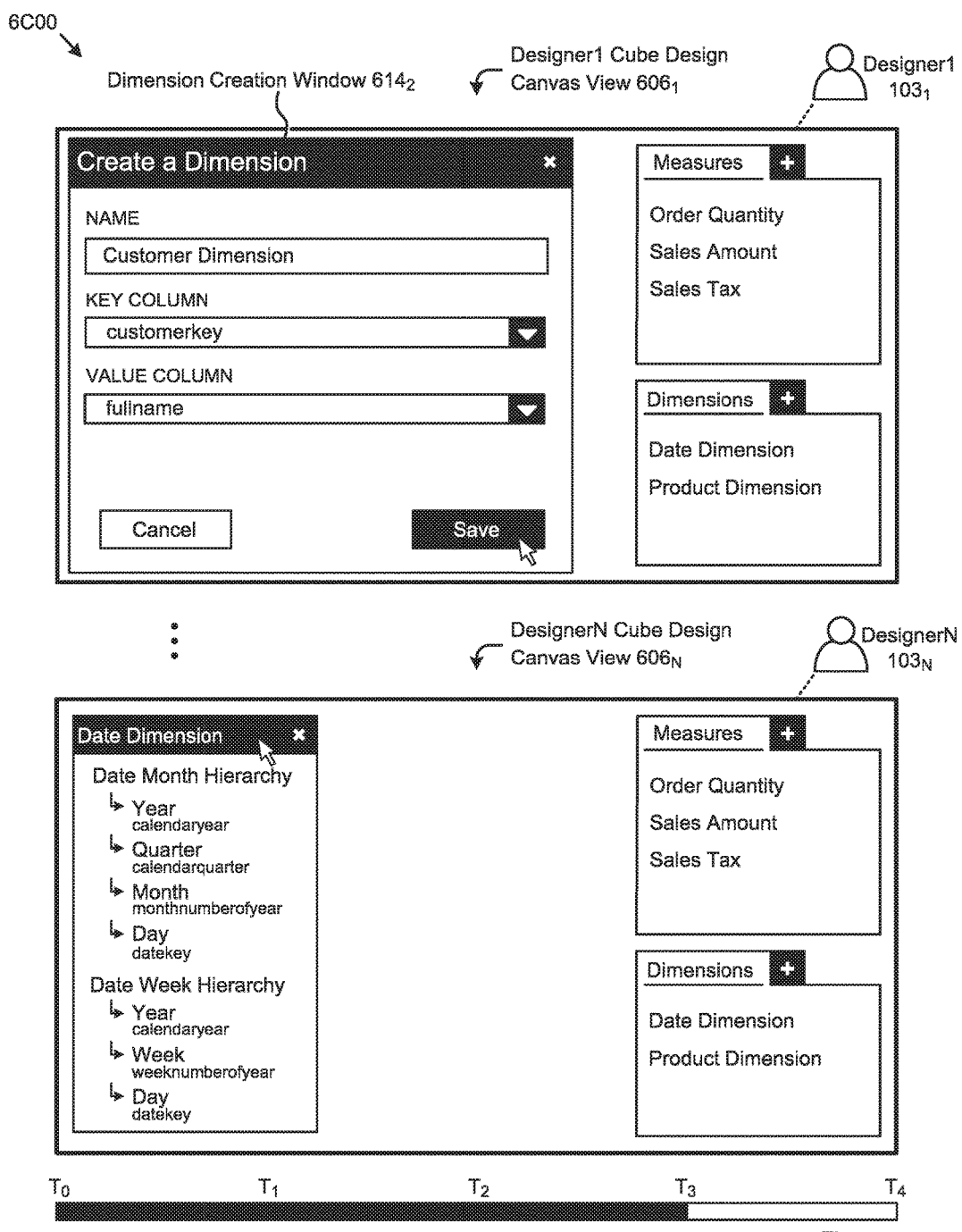
FIG. 6C depicts collaborative design interface views among collaborators completing a design transaction in systems for data model design collaboration using semantically correct collaborative objects, according to an embodiment.

FIG. 6C depicts collaborative design interface views 6C00 among collaborators completing a design transaction in systems for data model design collaboration using semantically correct collaborative objects, according to an embodiment. As an option, one or more instances of collaborative design interface views 6C00 or any aspect thereof may be implemented in the context of the architecture and functionality of the embodiments described herein. Also, the collaborative design interface views 6C00 or any aspect thereof may be implemented in any desired environment.

As shown, FIG. 6C comprises a designer1 cube design canvas view $606_1$ and a designerN cube design canvas view $606_N$ seen at a time $T_3$ by designer1 $130_1$ and designerN $130_N$, respectively, where designer1 $130_1$ and designerN $130_N$ are collaborating on the same virtual multidimensional data model. As indicated by the shown progress bar, the time $T_3$ occurs later than the time $T_2$ corresponding to the views in FIG. 6B. Specifically, designer1 $130_1$ has selected an interaction attribute (e.g., "VALUE COLUMN"="fullname") in the dimension creation window $614_2$ that can serve to complete a valid set of interaction attributes such that the "Save" button can be clicked. According to the herein disclosed techniques, clicking the "Save" button can generate a semantically correct unit of work object based on the specified interaction attributes, data model rules, and/or other inputs. The generated unit of work object can then be broadcast to the designers (e.g., designerN $130_N$) with access to the collaborative environment for the selected virtual multidimensional data model. As shown, the designerN $130_N$ has concurrently moved the "Date Dimension" window in the designerN cube design canvas view $606_N$, but has no visual indication of the interactions from designer1 $130_1$.

Figure 6D:
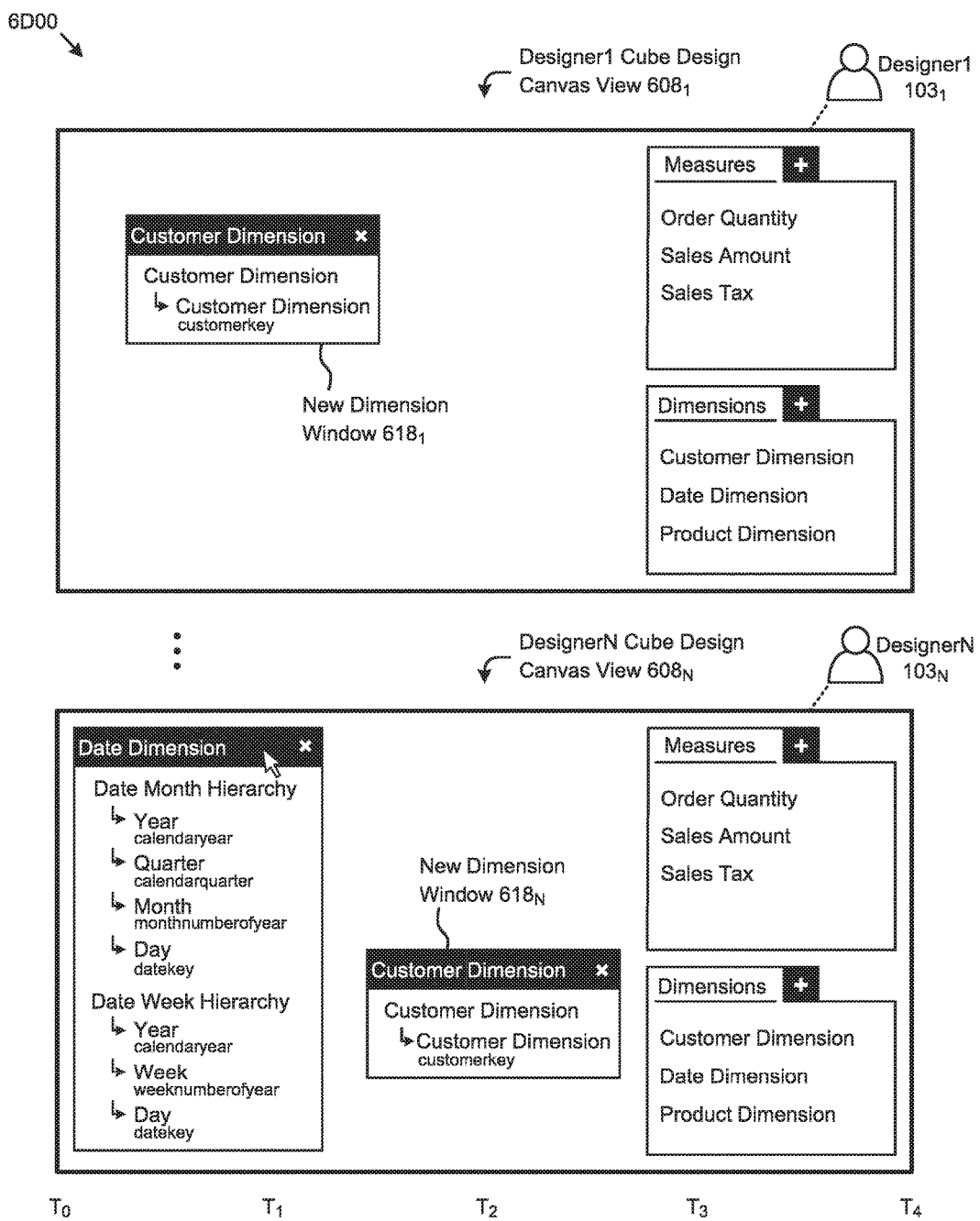
FIG. 6D depicts collaborative design interface views among collaborators showing the results of a design transaction in systems for data model design collaboration using semantically correct collaborative objects, according to an embodiment.

FIG. 6D depicts collaborative design interface views 6D00 among collaborators showing the results of a design transaction in systems for data model design collaboration using semantically correct collaborative objects, according to an embodiment. As an option, one or more instances of collaborative design interface views 6D00 or any aspect thereof may be implemented in the context of the architecture and functionality of the embodiments described herein. Also, the collaborative design interface views 6D00 or any aspect thereof may be implemented in any desired environment.

As shown, FIG. 6D comprises a designer1 cube design canvas view $608_1$ and a designerN cube design canvas view $608_N$ seen at a time $T_4$ by designer1 $130_1$ and designerN $130_N$, respectively, where designer1 $130_1$ and designerN $130_N$ are collaborating on the same virtual multidimensional data model. As indicated by the shown progress bar, the time $T_4$ occurs later than the time $T_3$ corresponding to the views in FIG. 6C. Specifically, in response to designer1 $130_1$ clicking the "Save" button in FIG. 6C to generate a semantically correct unit of work object associated with creating a dimension named "Customer Dimension", an instance of a "Customer Dimension" window (e.g., new dimension window $618_1$) is rendered in the designer1 cube design canvas view $608_1$ and another instance of the "Customer Dimension" window (e.g., new dimension window $618_N$) is rendered in the designerN cube design canvas view $608_N$. The semantically correct "Customer Dimension" is availed designer1 $130_1$, designerN $130_N$, and/or other collaborators for further design operations.

Additional Embodiments of the Disclosure

Additional Practical Application Examples

Figure 7:
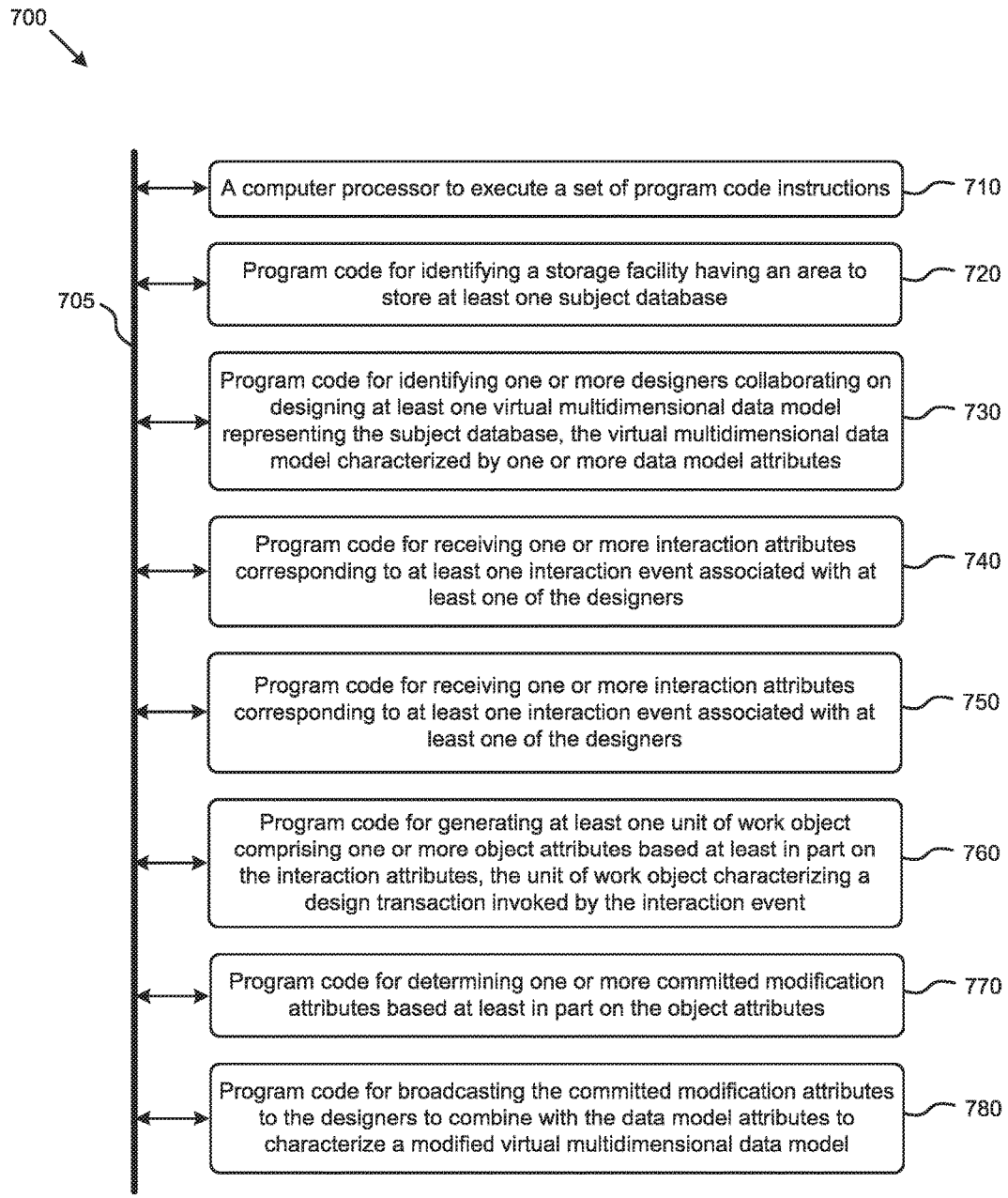
FIG. 7 depicts a system as an arrangement of computing modules that are interconnected so as to operate cooperatively to implement any of the herein-disclosed embodiments.

FIG. 7 depicts a block diagram of a system to perform certain functions of a computer system. As an option, the present system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment in FIG. 7 implements a portion of a computer system, shown as system 700, comprising a computer processor to execute certain program code instructions (see module 710) and modules for accessing memory to hold program code instructions to perform: identifying a storage facility having an area to store at least one subject database (see module 720); identifying one or more designers collaborating on designing at least one virtual multidimensional data model representing the subject database, the virtual multidimensional data model characterized by one or more data model attributes (see module 730); receiving one or more interaction attributes corresponding to at least one interaction event associated with at least one of the designers (see module 740); receiving one or more interaction attributes corresponding to at least one interaction event associated with at least one of the designers (see module 750); generating at least one unit of work object comprising one or more object attributes based at least in part on the interaction attributes, the unit of work object characterizing a design transaction invoked by the interaction event (see module 760); determining one or more committed modification attributes based at least in part on the object attributes (see module 770); and broadcasting the committed modification attributes to the designers to combine with the data model attributes to characterize a modified virtual multidimensional data model (see module 780).

System Architecture Overview

Additional System Architecture Examples

Figure 8A:
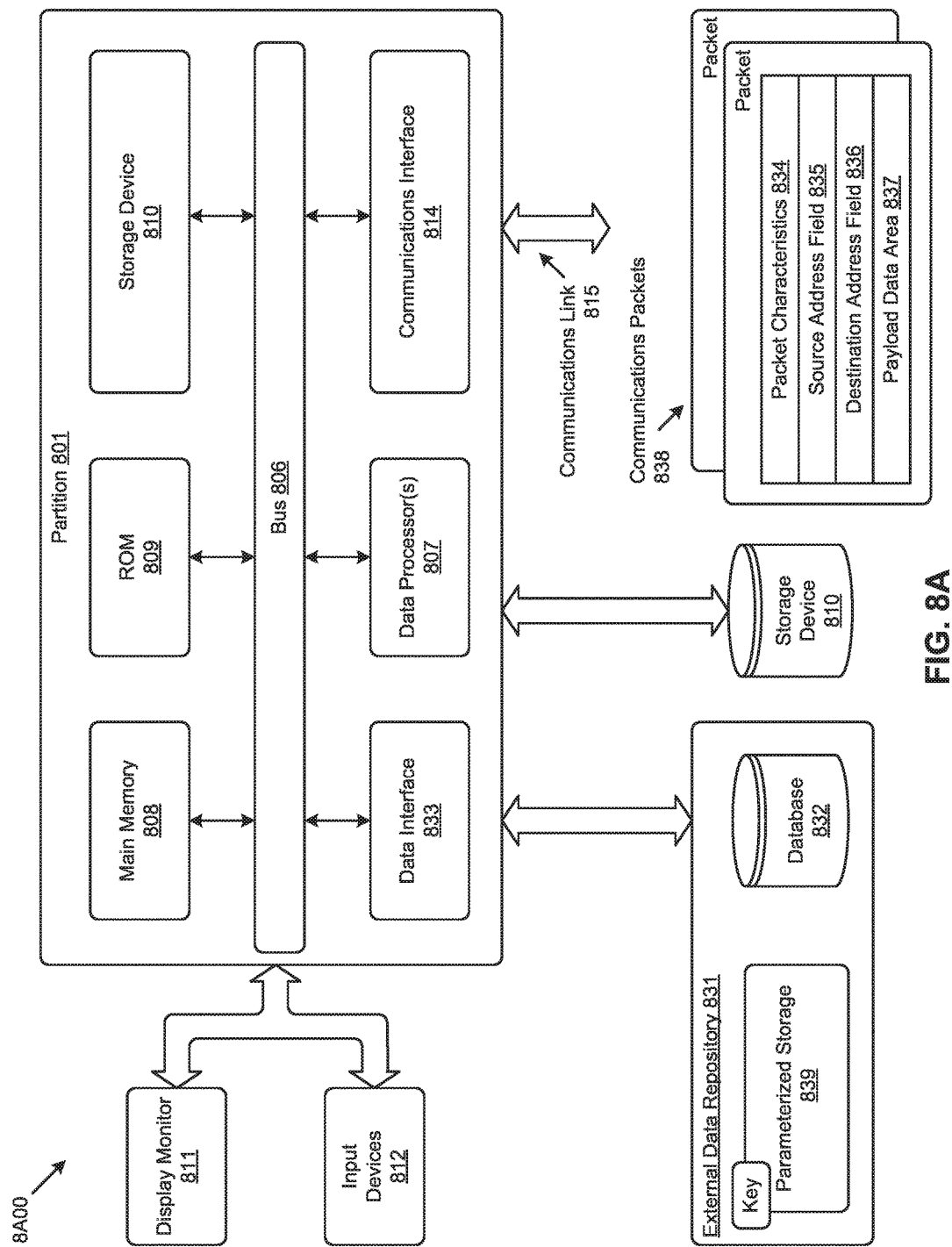
FIG. 8A and FIG. 8B depict exemplary architectures of components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information, which interconnects subsystems and devices such as a processor 807, a system memory (e.g., main memory 808, or an area of random access memory RAM), a static storage device (e.g., ROM 809), an internal or external storage device 810 (e.g., magnetic or optical), a data interface 833, a communication interface 814 (e.g., PHY, MAC, Ethernet interface, modem, etc.), a display 811 (e.g., CRT or LCD), input devices 812 (e.g., keyboard, cursor control), and an external data repository 831.

According to an embodiment of the disclosure, computer system 8A00 performs specific operations by processor 807 executing one or more sequences of one or more instructions contained in system memory. Such instructions may be read into system memory from another computer readable/usable medium such as a static storage device or a disk drive. The sequences can be organized to be accessed by one or more processing entities configurable to execute a single process or configurable to execute multiple concurrent processes to perform work. A processing entity can be hardware-based (e.g., involving one or more cores) or software-based or can be formed using a combination of hardware and software that implements logic, and/or can carry out computations and/or processing steps using one or more processes and/or one or more tasks and/or one or more threads or any combination therefrom.

According to an embodiment of the disclosure, computer system 8A00 performs specific networking operations using one or more instances of communication interface 814. Instances of the communication interface 814 may comprise one or more networking ports that are configurable (e.g., pertaining to speed, protocol, physical layer characteristics, media access characteristics, etc.) and any particular instance of the communication interface 814 or network access port thereto can be configured differently from any other particular instance. Portions of a communication protocol can be carried out in whole or in part by any instance of the communication interface 814, and data (e.g., packets, data structures, bit fields, etc.) can be positioned in storage locations within communication interface 814, or within system memory, and such data can be accessed (e.g., using random access addressing, or using direct memory access DMA, etc.) by devices such as processor 807.

The communications link 815 can be configurable to transmit (e.g., send, receive, signal, etc.) communications packets 838 comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics 834 include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data. Such data can be stored, for example, in any form of external data repository 831, which in turn can be formatted into any one or more storage areas, and which can comprise parameterized storage 839 accessible by a key (e.g., filename, table name, block address, offset address, etc.).

In an embodiment of the disclosure, execution of the sequences of instructions to practice the disclosure is performed by a single instance of the computer system 8A00. According to certain embodiments of the disclosure, two or more instances of computer system 8A00 coupled by a communications link 815 (e.g., LAN, PTSN, or wireless network) may perform the sequence of instructions to practice embodiments of the disclosure using two or more instances of components of computer system 8A00.

The computer system 8A00 may transmit and receive messages, data, and instructions including programs (e.g., application code), through communications link 815 and communication interface 814. Received program code may be executed by processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configurable to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 807. Some embodiments include one or more special-purpose hardware components (e.g., power control, logic, sensors, transducers, etc.). A module may include one or more state machines and/or combinational logic used to implement or facilitate the performance characteristics of high performance querying of large datasets using dynamic aggregate generation and updating.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of high performance querying of large datasets using dynamic aggregate generation and updating). Such files or records can be brought into and/or stored in volatile or non-volatile memory.

Figure 8B:
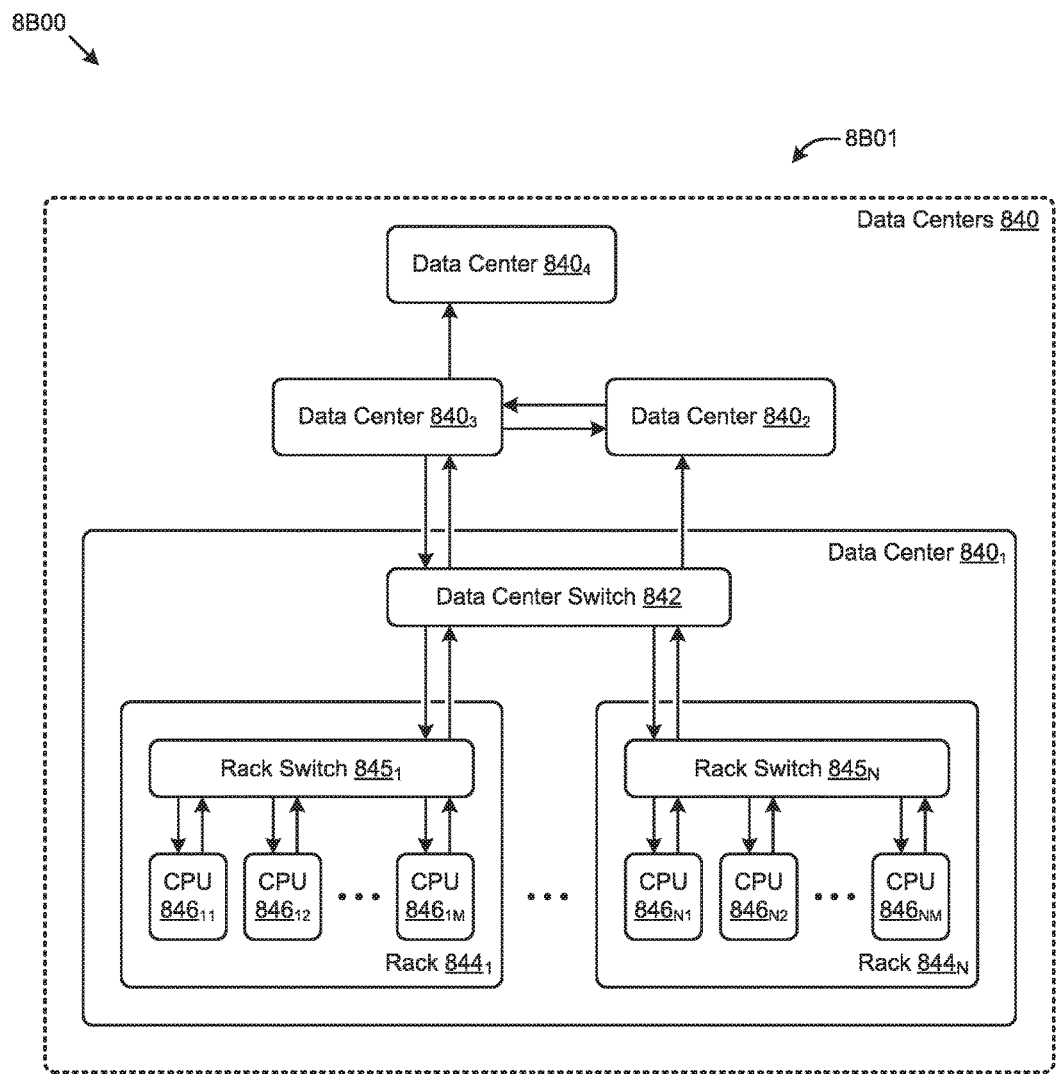

FIG. 8B depicts a block diagram 8B00 of an instance of a distributed data processing system 8B01 that may be included in a system implementing instances of the herein-disclosed embodiments. Distributed data processing system 8B01 may include many more or fewer components than those shown. The distributed data processing system 8B01 is used to store data, perform computational tasks, and transmit data between a plurality of data centers 840 (e.g., data center $840_1$, data center $840_2$, data center $840_3$, and data center

840₄). The distributed data processing system 8B01 may include any number of data centers. Some of the plurality of data centers 840 may be located geographically close to each other, and others may be located far from the other data centers.

The components of distributed data processing system 8B01 may communicate using dedicated optical links or other dedicated communication channels, and supporting hardware such as modems, bridges, routers, switches, wireless antennas and towers, and the like. In some embodiments, the component interconnections of the distributed data processing system 8B01 include one or more wide area networks (WANs) as well as one or more local area networks (LANs). In some embodiments, the distributed data processing system 8B01 utilizes a private network, such that a portion or all of the component interconnections of the distributed data processing system 8B01 are designed and operated exclusively for a particular company or customer. Alternatively, a public network may be used.

In some embodiments, each data center includes multiple racks that each include frames and/or cabinets into which computing devices can be mounted. For example, as shown, data center 840₁ includes a plurality of racks (e.g., rack 844₁ to rack 844_N), each comprising one or more computing devices. More specifically, rack 844₁ includes a first plurality of CPUs (e.g., CPU 846₁₁, CPU 846₁₂, to CPU 846_{1M}), and rack 844_N includes an Nth plurality of CPUs (e.g., CPU 846_{N1}, CPU 846_{N2}, to CPU 846_{NM}). The plurality of CPUs can include data processors, network attached storage devices, and other computer controlled devices. In some embodiments, at least one of the plurality of CPUs operates as a master processor, and controls the scheduling and data distribution and processing tasks performed throughout the distributed data processing system 8B01. In some embodiments, one or more of the plurality of CPUs may take on one or more roles, such as a master and/or slave. One or more of the plurality of racks can further include storage (e.g., one or more network attached disks) that is shared by the one or more of the plurality of CPUs.

In some embodiments, the CPUs within a respective rack are interconnected by a rack switch. For example, the CPUs in rack 844₁ are interconnected by a rack switch 845₁ and the CPUs in rack 844_N are interconnected by a rack switch 845_N. Further, the plurality of racks within data center 840₁ are interconnected by a data center switch 842. The distributed data processing system 8B01 can be implemented using other arrangements and partitioning of multiple interconnected processors, racks, and switches. For example, in some embodiments, the plurality of CPUs can be replaced by a single large-scale multiprocessor.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A computer-implemented method for data model design collaboration, the method comprising:
    identifying a storage facility having an area to store at least one subject database;
    identifying one or more designers collaborating on designing at least one virtual multidimensional data model representing the subject database, the at least one virtual multidimensional data model being characterized by one or more data model attributes stored in a multidimensional data metastore; and
    identifying one or more servers to perform operations comprising:
        receiving one or more interaction attributes corresponding to at least one interaction event associated with at least one of the designers;
        generating at least one unit of work object comprising one or more object attributes based at least in part on the interaction attributes, wherein the at least one unit of work object characterizes a design transaction invoked by the interaction event;
        determining one or more committed modification attributes based at least in part on the one or more object attributes; and
        broadcasting the one or more committed modification attributes to the designers before modifying the one or more data model attributes stored in the multidimensional data metastore.

2. The method of claim 1, wherein generating the at least one unit of work object is based at least in part on one of, one or more multidimensional data model rules, data model rules, syntactic rules, or semantic rules.

3. The method of claim 1, further comprising receiving a transaction end signal to invoke the determining of the one or more committed modification attributes.

4. The method of claim 1, wherein the one or more committed modification attributes are derived from one or more differences between the one or more object attributes and the data model attributes.

5. The method of claim 1, further comprising merging a plurality of the one or more object attributes associated with a respective plurality of designers to form one or more merged object attributes, wherein determining the one or more committed modification attributes is based at least in part on the one or more merged object attributes.

6. The method of claim 5, wherein the one or more committed modification attributes are derived from one or more differences between the one or more merged object attributes and the data model attributes.

7. The method of claim 5, further comprising validating the one or more merged object attributes.

8. The method of claim 7, wherein validating the one or more merged object attributes is based at least in part on one of, one or more multidimensional data model rules, data model rules, syntactic rules, or semantic rules.

9. The method of claim 1, further comprising:
    providing a multidimensional data model design application to the designers for operation on a respective one or more client devices; and
    detecting one or more user interactions with the multidimensional data model design application to invoke the interaction event.

10. The method of claim 9, further comprising presenting at least one of the one or more committed modification attributes in the multidimensional data model design application.

11. A computer program product, embodied in a non-transitory computer readable medium, the non-transitory computer readable medium having stored thereon a sequence of instructions which, when stored in memory and executed by a processor, causes the processor to perform a set of acts for data model design collaboration, the acts comprising:

receiving one or more interaction attributes corresponding to at least one interaction event associated with one or more designers collaborating on designing at least one virtual multidimensional data model representing a subject database, the at least one virtual multidimensional data model being characterized by one or more data model attributes stored in a multidimensional data metastore;

generating at least one unit of work object comprising one or more object attributes based at least in part on the interaction attributes, wherein the at least one unit of work object characterizes a design transaction invoked by the interaction event;

determining one or more committed modification attributes based at least in part on the one or more object attributes; and broadcasting the one or more committed modification attributes to the designers before modifying the one or more data model attributes stored in the multidimensional data metastore.

12. The computer program product of claim 11, wherein generating the at least one unit of work object is based at least in part on one of, one or more multidimensional data model rules, data model rules, syntactic rules, or semantic rules.

13. The computer program product of claim 11, wherein the one or more committed modification attributes are derived from one or more differences between the one or more object attributes and the data model attributes.

14. The computer program product of claim 11, further comprising instructions which, when stored in memory and executed by the processor, causes the processor to perform a set of acts, the acts comprising merging a plurality of the one or more object attributes associated with a respective plurality of designers to form one or more merged object attributes, wherein determining the one or more committed modification attributes is based at least in part on the one or more merged object attributes.

15. The computer program product of claim 14, wherein the one or more committed modification attributes are derived from one or more differences between the one or more merged object attributes and the data model attributes.

16. The computer program product of claim 14, further comprising instructions which, when stored in memory and executed by the processor, causes the processor to perform a set of acts, the acts comprising validating the one or more merged object attributes, wherein validating the one or more merged object attributes is based at least in part on one of, one or more multidimensional data model rules, data model rules, syntactic rules, or semantic rules.

17. A system for data model design collaboration, the system comprising:

a network access port to communicate over a bus to a query engine, wherein the query engine is interconnected to a storage facility having an area to store at least one subject database, and wherein the query engine is configured to interpret one or more subject database statements on the subject database;

a multidimensional data model design application to receive communications over the network access port, and to detect one or more user interactions from one or more designers collaborating on designing at least one virtual multidimensional data model representing the subject database, the at least one virtual multidimensional data model being characterized by one or more data model attributes stored in a multidimensional data metastore; and a multidimensional data model design collaboration engine to receive communications over the network access port, and to perform operations of, receiving one or more interaction attributes corresponding to at least one interaction event associated with the user interactions;

generating at least one unit of work object comprising one or more object attributes based at least in part on the interaction attributes, wherein the at least one unit of work object characterizes a design transaction invoked by the interaction event;

determining one or more committed modification attributes based at least in part on the one or more object attributes; and broadcasting the one or more committed modification attributes to the designers before modifying the one or more data model attributes stored in the multidimensional data metastore.

18. The system of claim 17, wherein the multidimensional data model design collaboration engine further performs operations of merging a plurality of the one or more object attributes associated with a respective plurality of designers to form one or more merged object attributes, wherein determining the one or more committed modification attributes is based at least in part on the one or more merged object attributes.

19. The system of claim 17, wherein generating the at least one unit of work object is based at least in part on one of, one or more multidimensional data model rules, data model rules, syntactic rules, or semantic rules.

20. The system of claim 17, wherein the one or more committed modification attributes are derived from one or more differences between the one or more object attributes and the data model attributes.

* * * * *